US010560576B1

(12) United States Patent
Kim et al.

(10) Patent No.: US 10,560,576 B1
(45) Date of Patent: Feb. 11, 2020

(54) ELECTRONIC DEVICE FOR PERFORMING TASK INCLUDING CALL IN RESPONSE TO USER UTTERANCE AND OPERATION METHOD THEREOF

(71) Applicant: Samsung Electronics Co., Ltd., Suwon-si, Gyeonggi-do (KR)

(72) Inventors: Kwangyoun Kim, Suwon-si (KR); Woochan Kim, Suwon-si (KR); Yusic Kim, Suwon-si (KR); Juyeoung Kim, Suwon-si (KR); Jaeeun Suh, Suwon-si (KR); Eunsu Jeong, Suwon-si (KR); Jihyun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/534,950

(22) Filed: Aug. 7, 2019

(30) Foreign Application Priority Data

Aug. 7, 2018 (KR) .................. 10-2018-0091964

(51) Int. Cl.
*H04M 3/51* (2006.01)
*G06F 3/0482* (2013.01)
(Continued)

(52) U.S. Cl.
CPC ........ *H04M 3/5166* (2013.01); *G06F 3/0482* (2013.01); *G06F 3/04883* (2013.01); *G10L 17/005* (2013.01)

(58) Field of Classification Search
CPC .... H04M 3/5166; H04M 3/51; H04M 3/5183; H04M 3/523; H04M 3/5237; H04M 2203/40; G06F 3/0482; G10L 17/005
(Continued)

(56) References Cited

U.S. PATENT DOCUMENTS

| 6,373,817 B1 * | 4/2002 | Kung .................. H04L 12/5692 370/215 |
| 2012/0014515 A1 * | 1/2012 | Velarde .................. H04M 1/56 379/88.13 |

(Continued)

FOREIGN PATENT DOCUMENTS

| JP | 2005292476 A | 10/2005 |
| JP | 2015-019347 A | 1/2015 |

(Continued)

OTHER PUBLICATIONS

International Search Report and Written Opinion of the International Searching Authority for International Application No. PCT/KR2019/009864 dated Nov. 21, 2019, 9 pages.

*Primary Examiner* — Thjuan K Addy

(57) ABSTRACT

An electronic device includes: a microphone; a speaker; a touchscreen display; a communication circuit; at least one processor; and a memory storing instructions that, when executed, cause the at least one processor to: receive a first user input; identify a service provider and a detailed service; select a first menu corresponding to the detailed service from menu information; attempt to connect a call to the service provider; when the call to the service provider is connected, transmit one or more responses until reaching a step corresponding to the first menu; in response to reaching the first menu, determine whether an attendant is connected; in response to completion of connection to the attendant, output a notification indicating that the connection to the attendant has been completed; and in response to reception of a second user input for the output notification, display a screen for a call with the service provider.

20 Claims, 24 Drawing Sheets

(51) Int. Cl.
*G10L 17/00* (2013.01)
*G06F 3/0488* (2013.01)

(58) Field of Classification Search
USPC ............ 379/265.02, 265.05, 265.11, 265.13,
379/265.12, 266.01, 266.02, 265.01, 247,
379/916, 917, 88.01
See application file for complete search history.

(56) References Cited

U.S. PATENT DOCUMENTS

2012/0069131 A1* 3/2012 Abelow ............... G06Q 10/067
348/14.01
2016/0198045 A1 7/2016 Kulkarni et al.

FOREIGN PATENT DOCUMENTS

| KR | 10-2001-0102798 A | 11/2001 |
| KR | 10-0458448 B1 | 12/2004 |
| KR | 10-2009-0108821 A | 10/2009 |
| KR | 10-2012-0095626 A | 8/2012 |
| KR | 10-1176405 B1 | 8/2012 |
| KR | 10-2015-0121689 A | 10/2015 |

* cited by examiner

ELECTRONIC DEVICE FOR PERFORMING TASK INCLUDING CALL IN RESPONSE TO USER UTTERANCE AND OPERATION METHOD THEREOF

CROSS-REFERENCE TO RELATED APPLICATIONS

This application is based on and claims priority under 35 U.S.C. 119 of Korean Patent Application No. 10-2018-0091964, filed on Aug. 7, 2018, in the Korean Intellectual Property Office, the disclosure of which is incorporated herein by reference in its entirety.

BACKGROUND

1. Field

Various embodiments relate to an electronic device that performs a task including a call in response to a user utterance, and an operation method thereof.

2. Description of the Related Art

As technology has been developed, technology capable of receiving an utterance from a user to provide various content services based on user intent or to perform specific functions within an electronic device via a voice recognition service and a voice recognition interface has arisen. Linguistic understanding is technology for recognizing, applying, and processing human language/characters and includes natural language processing, machine translation, dialogue systems, query responses, speech recognition/synthesis, and the like.

Automatic Speech recognition (ASR) may allow reception of an input user voice, extraction of an acoustic feature vector therefrom, and generation of text corresponding to the input voice. Via the ASR, an electronic device may receive natural language through direct input by a user. Natural language is language commonly used by humans, and a machine is unable to directly understand natural language without additional analysis. In general, a Natural Language Understanding (NLU) method in a speech recognition system may be classified into two types. The first is a method of understanding a spoken language via a passive semantic-level grammar, and the other is a method of understanding a word string in relation to a semantic structure defined on the basis of a language model generated by a statistical method.

An electronic device may provide various forms of voice-based services to a user via the described voice recognition and natural language processing.

SUMMARY

A service provider providing various services through a call with an attendant may request, after a customer using a service makes a call, the customer to press a button to select a desired service or may request user authentication. The procedure of requesting by the service provider may take an excessive amount of time. A waiting time for connection to the attendant may take several minutes to several tens of minutes, which is excessive time for the customer to use the service.

An electronic device according to the disclosure may reduce a waiting time of a user in terms of using a service provided by a service provider and may allow the user to smoothly use the service. The electronic device according to the disclosure may process an utterance of the user so as to, on behalf of the user, make a call to the service provider, press a button for selecting a desired service, and determine whether an attendant is connected, and the electronic device provides a notification to the user. The electronic device according to the disclosure may enable the user to use other functions of the electronic device until the service provider's attendant is connected.

An electronic device according to various embodiments may include: a microphone; a speaker; a touchscreen display; a communication circuit; at least one processor operatively connected to the microphone, the speaker, the touchscreen display, and the communication circuit; and a memory operatively connected to the processor, wherein the memory stores instructions configured to, when executed, cause the at least one processor to: receive a first user input through the touchscreen display or the microphone; identify a service provider and a detailed service based on at least a part of the first user input; select a first menu corresponding to the detailed service from menu information including one or more detailed service provided by the service provider; attempt to connect a call to the service provider by using the communication circuit; when the call to the service provider is connected, transmit one or more responses until reaching a step corresponding to the first menu, in response to one or more voice prompts provided by the service provider; in response to reaching the first menu, determine whether an attendant is connected, based on at least one voice transmitted by the service provider; in response to completion of connection to the attendant, output a notification indicating that connection to the attendant has been completed, using the speaker or the touchscreen display; and in response to reception of a second user input for the output notification, display a screen for a call with the service provider.

An electronic device according to various embodiments may include: a speaker; a touchscreen display; a communication circuit; at least one processor operatively connected to the speaker, the display, and the communication circuit; and a memory operatively connected to the processor, wherein the memory stores instructions configured to, when executed, cause the at least one processor to: execute a calling application; attempt to connect a call to a service provider using the communication circuit; during call connection to the service provider, receive a first user input to request a standby mode for connection to an attendant of the service provider, the calling application being executed in the background in the standby mode; in response to the first user input, execute the calling application in the standby mode; while the calling application is being executed in the standby mode, determine whether the attendant is connected, based on a voice transmitted by the service provider; in response to completion of connection to the attendant, output a notification indicating that connection to the attendant has been completed, using the speaker or the touchscreen display; and in response to reception of a second user input for the output notification, terminate the standby mode.

An electronic device according to various embodiments may include: a communication circuit; at least one processor operatively connected to the communication circuit; and a memory operatively connected to the processor, wherein the memory stores instructions configured to, when executed, cause the at least one processor to: receive a request for a call connection to a service provider from an external electronic device, the request including user information of the external electronic device and at least one piece of keyword information related to a detailed service and the service provider; in response to the request, acquire an identification number for the call connection to the service provider; select a first menu corresponding to the detailed service included in the request from menu information including one or more detailed services provided by the service provider; attempt to connect a call between the external electronic device and the service provider; when the call to the service provider is connected, transmit one or more responses until reaching a step corresponding to the first menu, in response to one or more voice prompts provided by the service provider; in response to reaching the first menu, determine whether an attendant is connected, based on at least one voice transmitted by the service provider; in response to completion of connection to the attendant, provide the external electronic device with information indicating that connection to the attendant of the service provider has been completed, using the communication circuit; and in response to reception of a message indicating that the call between the external electronic device and the service provider has been connected, terminate the call connection to the service provider.

According to various embodiments, an electronic device capable of attempting to connect a call to an external electronic device in response to a user utterance and an operation method thereof may be provided.

An electronic device according to various embodiments can perform at least one action on behalf of a user during a call to a connected external electronic device, in response to a user utterance.

An electronic device according to various embodiments can improve a user experience by connecting a call to a call center on behalf of a user of the electronic device and executing a calling application in the background until an attendant of the call center is connected.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
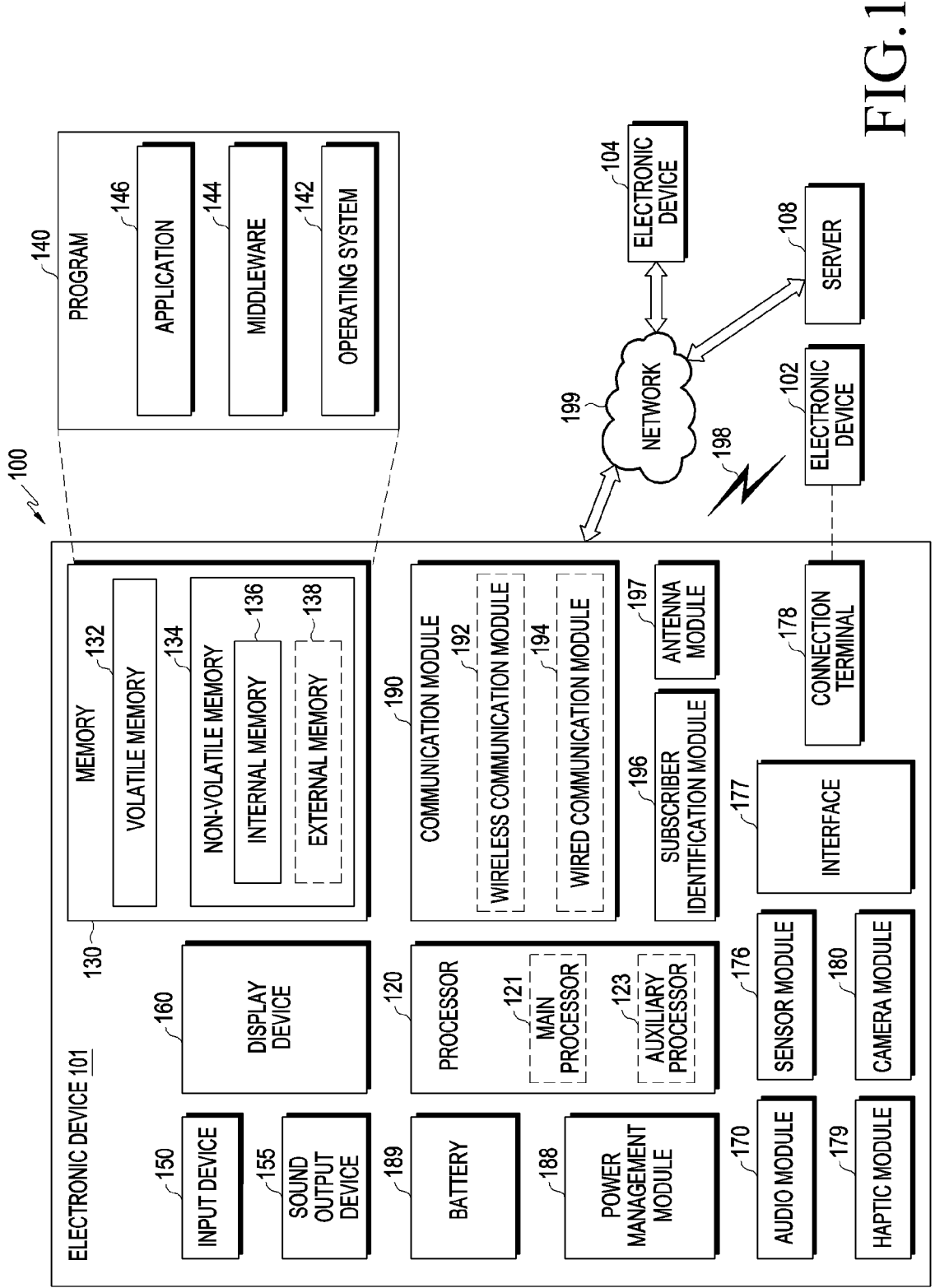
FIG. 1 illustrates a block diagram of an electronic device in a network environment according to various embodiments.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
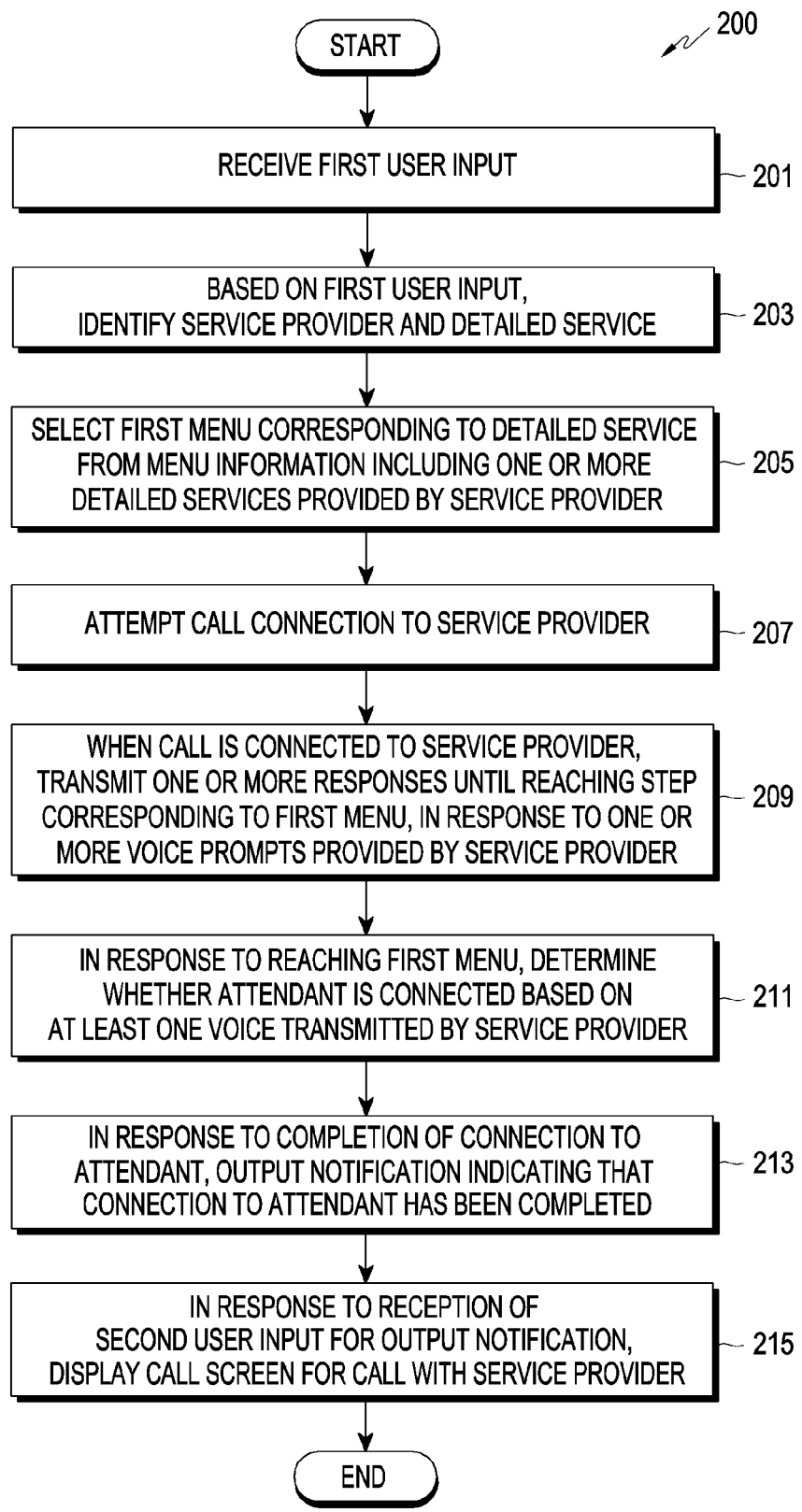
FIG. 2 illustrates a flowchart for explaining an operation method of the electronic device according to various embodiments.
Figure 3:
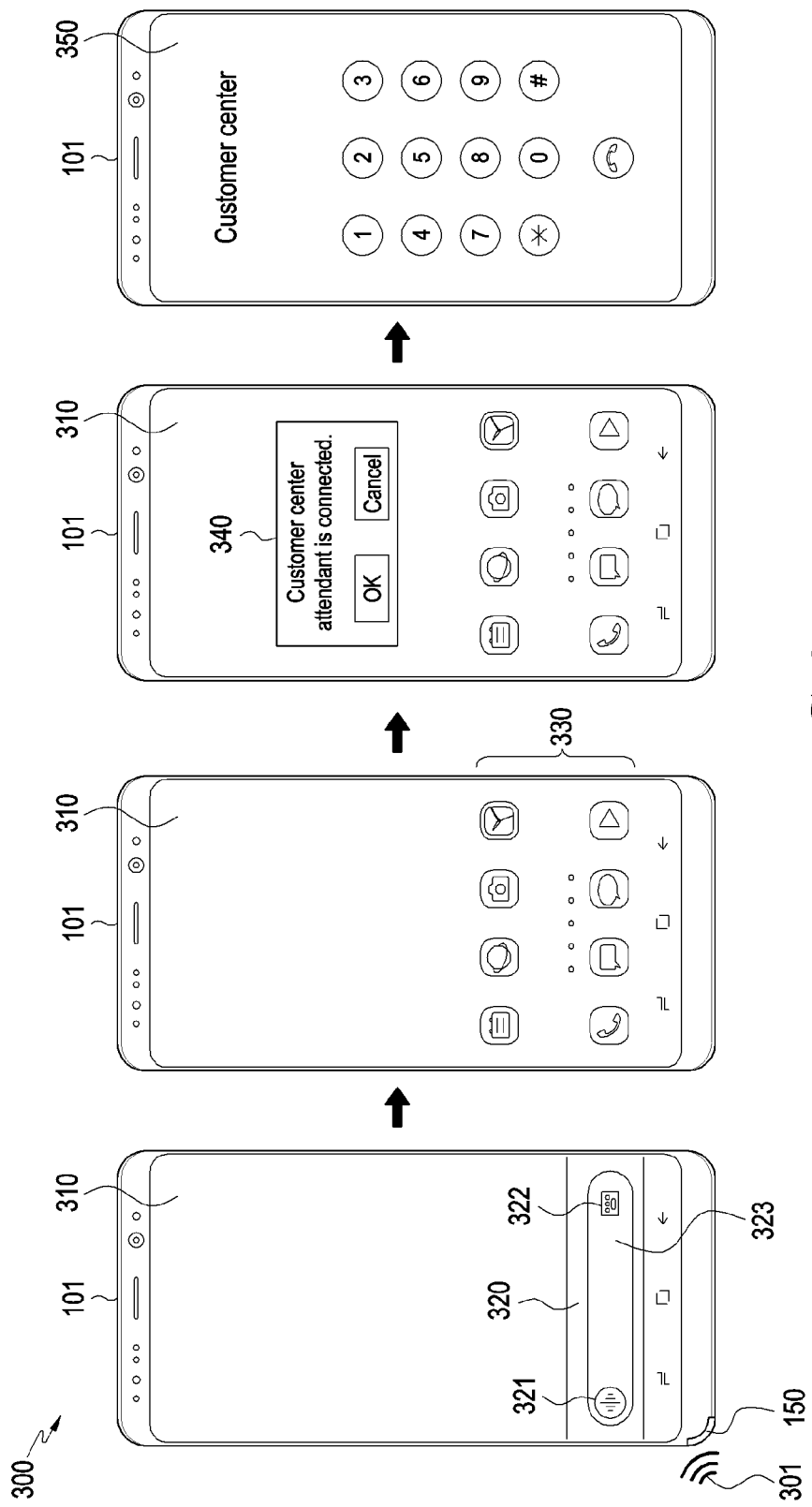
FIG. 3 illustrates conceptual diagrams for explaining a procedure of connecting a call to an external electronic device on the basis of a user utterance according to various embodiments.

FIG. 2 illustrates a flowchart 200 for explaining an operation method of an electronic device according to various embodiments. The embodiment of FIG. 2 will be described in more detail with reference to FIG. 3. FIG. 3 illustrates conceptual diagrams 300 for explaining a procedure of connecting a call to an external electronic device on the basis of a user utterance according to various embodiments.

In operation 201, an electronic device 101 (e.g., a processor 120) may receive a first user input through a touchscreen display (e.g., an input device 150 or a display device 160) or a microphone (e.g., the input device 150). The first user input may include a request to make a call to an external electronic device by using the electronic device 101. For example, as shown in FIG. 3, the electronic device 101 may receive a user utterance 301 by using the microphone 150. The electronic device 101 may display one or more screens on a touchscreen display 310. The electronic device 101 may display an execution screen 320 for reception of the user utterance 301 on at least a part of the touchscreen display 310. The electronic device 101 may process the user utterance by a calling application (a native calling application) or an enhanced calling application, and the execution screen 320 for reception of the user utterance 301 may be displayed by the native calling application or the enhanced calling application. The execution screen 320 may include an indicator 321 indicating that listening is being performed, an OK icon 322, and a text display window 323. The electronic device 101 may activate the microphone 150, and may display, for example, the indicator 321 indicating that listening is being performed. The electronic device 101 may input text or a command acquired as a result of processing the user utterance 301 into the text window 323 so as to display the same. When the OK icon 322 is designated, the electronic device 101 may perform a task corresponding to the text or command within the text display window 323. For example, the electronic device 101 may receive the user utterance 301 of "How much is the Samsung Card payment this month?" through the microphone 150. The electronic device 101 may display text indicating "How much is the Samsung Card payment this month?" within the text display window 323, and when the OK icon 322 is selected, the electronic device 101 may perform a task included in "How much is the Samsung Card payment this month?". According to a voice recognition analysis result, the electronic device 101 may confirm multiple tasks of at least one operation for reaching steps of executing the calling application, inputting a phone number corresponding to Samsung Card or connecting a call to Samsung Card, and confirming a payment amount after connecting the call. For example, the electronic device 101 may directly confirm the multiple tasks, or may receive the multiple tasks from a server 108 for voice recognition analysis. Hereinafter, confirmation of specific information by the electronic device 101 may be understood as confirmation of the specific information on the basis of information received from the server 108. The electronic device 101 may stop displaying the execution screen 320 in response to selection of the OK icon 322. Referring to FIG. 3, according to the stoppage of displaying the execution screen 320, at least one screen displayed prior to the display of the execution screen 320 may be displayed on the touchscreen display 310. For example, an execution screen 330 of a launcher application may be displayed. The execution screen 330 of the launcher application may include at least one icon for execution of at least one application.

In operation 203, the electronic device 101 may identify a service provider and a detailed service on the basis of the received first user input. The service provider may provide one or more services by using a call connection. For example, a Samsung Card customer center may provide a service, such as card application, payment information confirmation, and lost card report, via the call connection. The detailed service may be one of one or more services provided by the service provider. For example, on the basis of user input of "How much is the Samsung Card payment this month?", the electronic device 101 may identify the "Samsung Card customer center" as the service provider and may identify "payment amount inquiry" as the detailed service. The electronic device 101 may search for one or more keywords related to the detailed service or the service provider from the first user input, in information on multiple service providers. For example, the electronic device 101 may extract, as a keyword. "Samsung", "Samsung Card", "this month", "payment", "payment amount", or "how much" from "How much is the Samsung Card payment this month?". The electronic device 101 may identify a Samsung Card customer center as the service provider by using the keyword "Samsung Card". The electronic device 101 may store information on multiple service providers that provide one or more services, or may receive information on the multiple service providers from the external server 108. The example 101 may identify the service provider by selecting "Samsung Card customer center", which matches the keyword "Samsung Card", from among the multiple service providers. The electronic device 101 may identify "payment amount inquiry" as the detailed service by using the keyword "this month", "payment amount", or "how much".

In operation 205, the electronic device 101 may acquire menu information including one or more detailed services provided by the identified service provider. The electronic device 101 may select a first menu corresponding to the identified detailed service from the menu information of the identified service provider. For example, the electronic device 101 may select a payment amount item from "individual member information inquiry" in response to "payment amount inquiry" in the menu information of the Samsung Card customer center.

In operation 207, the electronic device 101 may attempt to connect a call to the identified service provider. The electronic device 101 may acquire a phone number of the identified service provider, and may make a call to the service provider by using the phone number. The electronic device 101 may connect the call via the calling application or the enhanced calling application in the background. The enhanced calling application may direct connect the call, or may connect the call by execution of the calling application. For example, the electronic device 101 may attempt to connect the call by pressing a button provided by the calling application, which corresponds to a number corresponding to the phone number, without separate user input. The electronic device 101 may not display an execution screen related to the call connection. The electronic device 101 may limit the functions of the microphone 150 and a speaker 155 while the call is being connected in the background.

In operation 209, when the call to the service provider is connected, the electronic device 101 may transmit one or more responses until reaching a step corresponding to the first menu, in response to one or more voice prompts provided by the service provider. The electronic device 101 may receive a voice prompt from the service provider, and may transmit a response corresponding to the received voice prompt on the basis of information on the first menu. For example, the electronic device 101 may receive a voice prompt, such as "Press 1 for individual members, or press 2 for corporate members" from the service provider, and may transmit a response of pressing button 1, on the basis of which the first menu is the payment amount item in "individual member information inquiry". The electronic device 101 may sequentially receive multiple voice prompts, and may determine and transmit responses corresponding to the respective voice prompts. For example, the electronic device 101 may transmit the responses by selecting at least some numbers on a keypad provided by the calling application or the enhanced calling application.

In operation 211, the electronic device 101 may determine whether an attendant is connected on the basis of at least one voice transmitted by the service provider in response to reaching the first menu. The service provider may include connection to an attendant in order to provide a service corresponding to the first menu, and when a corresponding menu is selected after the call is connected, the service provider may proceed with the connection to an attendant. When an attendant cannot be connected immediately after the corresponding menu is selected, the service provider may request to wait until the attendant is connected. The service provider may transmit an announcement relating to a standby state while connecting to an attendant. When connection to an attendant is completed, the service provider may transmit an utterance of the attendant. The electronic device 101 may determine, using a determination model, whether the voice transmitted by the service provider is an utterance of the attendant or an announcement previously stored as an Automatic Response Service (ARS).

In operation 213, in response to completion of connection to the attendant, the electronic device 101 may output a notification, indicating that the attendant has been connected, by means of the touchscreen display 310 or the speaker 155. For example, as shown in FIG. 3, the electronic device 101 may display a pop-up window 340 on at least a part of the touchscreen display 310. The pop-up window 340 may include text indicating that an attendant has been connected. The pop-up window 340 may include an OK icon for connection to the attendant and a cancel icon for cancellation of connection to the attendant. The electronic device 101 may output a designated notification sound using the speaker 155. The electronic device 101 may simultaneously display a notification message on the pop-up window 340 and output the notification sound.

In operation 215, the electronic device 101 may display a call screen 350 for the call with the service provider in response to reception of a second user input for the output notification. For example, in response to selection of the OK icon in the pop-up window 340 of FIG. 3, the electronic device 101 may display the call screen 350 for the call with the service provider on the touchscreen display 310. The electronic device 101 may release the function limitation of the microphone 150 and the speaker 155 in response to reception of the second user input for the output notification.

The electronic device 101 may display the call screen 350, may receive a user utterance through the microphone 150, and may output, through the speaker 155, a voice transmitted from the service provider.

Figure 4:
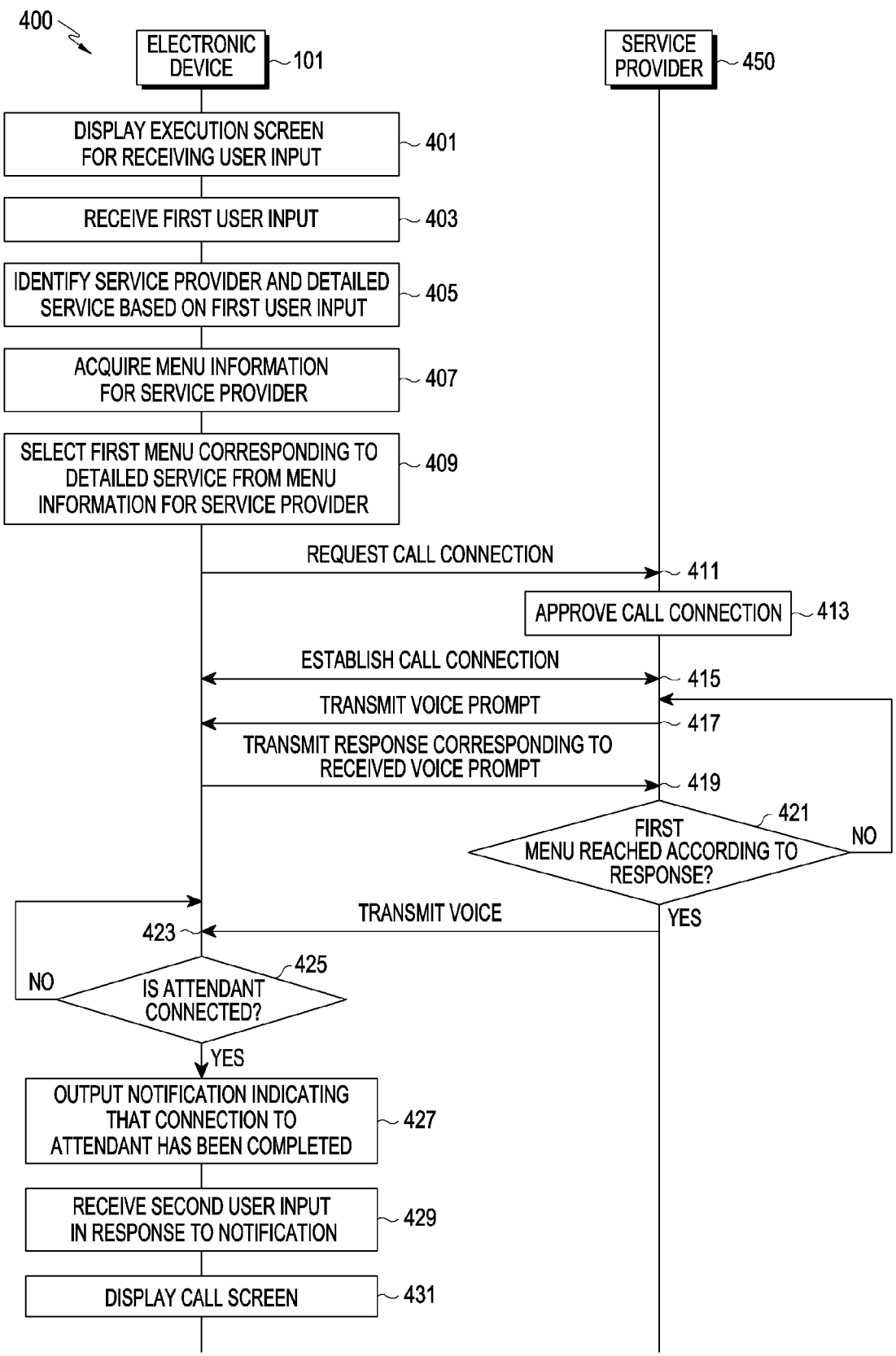
FIG. 4 illustrates a flowchart for explaining the operation of the electronic device and a service provider according to various embodiments.

FIG. 4 illustrates a flowchart 400 for explaining the operation of the electronic device 101 and a service provider 450 according to various embodiments. In various embodiments, the electronic device 101 may connect a call to the service provider 450 in response to a request for a call connection according to a user utterance.

In operation 401, the electronic device 101 (e.g., the processor 120) may display an execution screen for reception of a user input. The execution screen may display an icon for reception of a user utterance or may display an input window for reception of a text input.

In operation 403, the electronic device 101 may receive a first user input through the touchscreen display 310 or the microphone 150.

In operation 405, the electronic device 101 may identify a service provider and a detailed service on the basis of the received first user input. The electronic device 101 may identify a service provider and a detailed service by extracting one or more keywords from the first user input. For example, the electronic device 101 may identify the service provider 450 from a list of multiple service providers by selecting a service provider matching one or more keywords extracted from the first user input. The electronic device 101 may select one from among the one or more keywords and identify the selected keyword as the detailed service.

In operation 407, the electronic device 101 may acquire menu information for the service provider 450. The menu information for the service provider 450 may be acquired from the memory 130 of the electronic device 101 or may be acquired from the external server 108.

In operation 409, the electronic device 101 may select a first menu corresponding to the detailed service from the menu information for the service provider 450.

In operation 411, the electronic device 101 may request call connection from the identified service provider 450.

In operation 413, the service provider 450 may approve a call connection with the electronic device 101 in response to the call connection request from the electronic device 101.

In operation 415, the call connection may be established between the electronic device 101 and the service provider 450.

In operation 417, the service provider 450 may sequentially transmit determined voice prompts on the basis of the menu information. For example, after establishment of the call connection, the service provider 450 may transmit a voice prompt of "Please, enter your mobile phone number" which is configured so as to have a highest priority in the menu information. The service provider 450 may identify the user of the electronic device 101 that initiated the call.

In operation 419, the electronic device 101 may receive a voice prompt and may transmit a response corresponding to the received voice prompt. For example, the electronic device 101 may perform an action of sequentially pressing buttons corresponding to a phone number of the electronic device 101 in response to the voice prompt, such as "Please, enter your mobile phone number". The electronic device 101 may determine a response corresponding to the received voice prompt on the basis of the information of the first menu, and may transmit the determined response.

In operation 421, the service provider 450 may determine whether the first menu has been reached on the basis of the received response. The first menu may provide a service including connection to an attendant. In response to reaching the first menu, the service provider 450 may attempt to connect to an attendant. Due to limited resources, it may take time to complete connection to an attendant. The service provider 450 may transmit, to the electronic device 101, a voice prompt according to the received response until reaching the first menu. For example, the service provider 450 may repeat operation 417 until reaching the first menu.

In operation 423, the service provider 450 may transmit a voice. While attempting to connect to an attendant, the service provider 450 may transmit a voice prompt indicating a standby state for connecting to the attendant. Here, the voice prompt may be an announcement previously stored as the ARS. The announcement may be generated by a machine. The service provider 450 may transmit a voice of an attendant in response to completion of connection to the attendant. The attendant may be a person, and the voice of the attendant may be different from that generated by the machine.

In operation 425, the electronic device 101 may determine whether an attendant is connected on the basis of the received voice. The electronic device 101 may check correlation with the received voice using a determination model for an attendant voice, and may determine that the received voice signal is the attendant voice according to the result of checking when the correlation has a value higher than a threshold value. For example, the electronic device 101 may use, as a determination model, a deep-learning model generated by performing deep learning for multiple pre-stored audio signals having a label of an attendant voice. The electronic device 101 may compare the received voice with the deep-learning model in order to determine whether an attendant is connected.

In operation 427, if an attendant is connected, the electronic device 101 may output a notification indicating that the connection to the attendant has been established. For example, the electronic device 101 may output text, indicating that the connection to the attendant has been established, through the touchscreen display 310, or may output a notification sound specified for indicating connection to the attendant.

In operation 429, the electronic device 101 may receive a second user input in response to the output notification. For example, the electronic device 101 may receive, through the touchscreen display 310, the second user input for selecting an OK icon additionally displayed in the output text window.

In operation 431, the electronic device 101 may display a call screen of the call with the service provider 450. The electronic device 101 may display a call screen, may output a voice signal transmitted from the service provider 450 through the speaker 155, and may receive a user utterance through the microphone 150.

Figure 5:
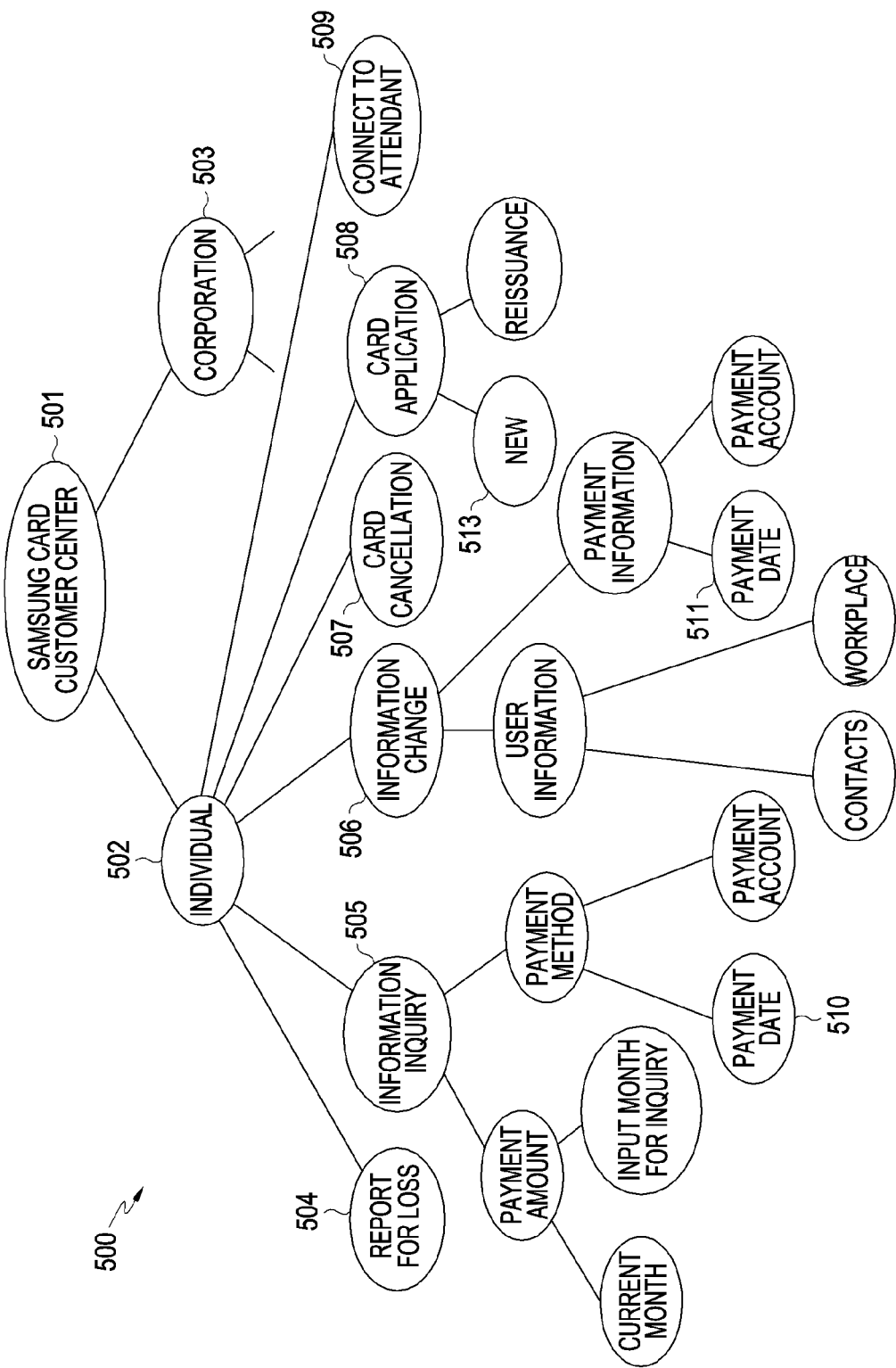
FIG. 5 illustrates a tree structure for menu information provided by the service provider according to various embodiments.

FIG. 5 illustrates a tree structure 500 for menu information provided by the service provider according to various embodiments. The electronic device 101 (e.g., the processor 120) may store, in a tree structure, menu information provided by a service provider (e.g., the service provider 450 in FIG. 4), or may receive the menu information from the external server 108. For example, it is assumed that the service provider 450 is a Samsung Card customer center 501. FIG. 5 is a tree structure indicating menu information of multiple services provided via a call connection to the Samsung Card customer center 501. A root node in the tree structure for the menu information may indicate the service provider 450. Referring to FIG. 5, the Samsung Card customer center 501 may be the root node. The Samsung Card customer center 501 may provide services for individual members and services for corporate members, and an individual 502 and a corporation 503 may be included as child nodes of the root node in the tree structure for the menu information. The Samsung Card customer center 501 may provide an individual member with services for lost card report, information inquiry, information change, card cancellation, card application, and attendant connection. Each service is a child node of the individual 502 indicating an individual member, and may be included as lost card report 504, information inquiry 505, information change 506, card cancellation 507, card application 508, or attendant connection 509 in the tree structure for the menu information.

Figure 6:
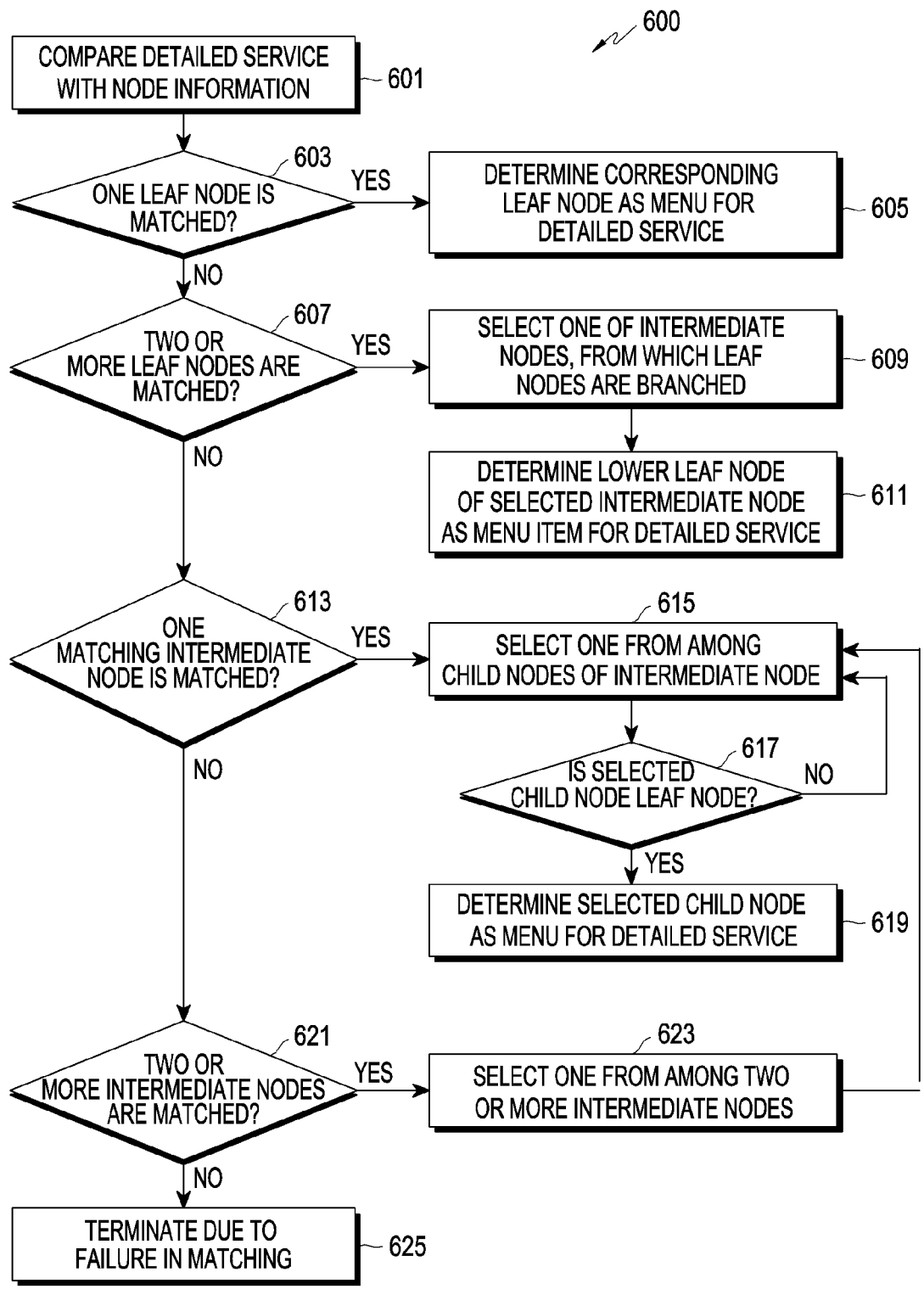
FIG. 6 illustrates a flowchart for explaining an operation of selecting, by the electronic device, a menu corresponding to a detailed service from menu information provided by the service provider according to various embodiments.

FIG. 6 illustrates a flowchart 600 for explaining an operation of selecting, by the electronic device, a menu corresponding to a detailed service from among menu information provided by a service provider according to various embodiments. The electronic device 101 (e.g., the processor 120) may identify a service provider (e.g., the service provider 450) and a detailed service by using one or more keywords included in a user utterance. For example, when a user utterance of "Apply to Samsung Card for a new card" is received, the electronic device 101 may extract keywords, such as "Samsung Card", "new card", and "apply for card". The electronic device 101 may identify a Samsung Card customer center (e.g., the Samsung Card customer center 501 in FIG. 5) as the service provider 450 on the basis of the keyword "Samsung Card", and may identify issuance of a new card as the detailed service on the basis of the keywords of "new card" and "apply for card". The electronic device 101 may perform matching with the detailed service in the menu information of the service provider 450 having the tree structure. For example, the electronic device 101 may select a node corresponding to the detailed service in the tree structure for the menu information of the Samsung Card customer center 501. Operations of FIG. 6 will be described with reference to the tree structure 500 for the menu information of Samsung Card, in FIG. 5.

In operation 601, the electronic device 101 may compare node information with a detailed service in the menu information tree structure 500. For example, referring to FIG. 5, the electronic device 101 may compare new card issuance with information of each node included in FIG. 5. For example, when new card issuance and a lost-card-reporting node 504 are compared, the electronic device 101 may determine that the comparison does not result in a match. When new card issuance, a card application node 508, and a new node 513 are compared, the electronic device 101 may determine that the comparison results in a match to the new node 513. The electronic device 101 may determine that one or more matching leaf nodes exists.

In operation 603, the electronic device 101 may determine whether there is one matching leaf node, as a result of matching. For example, the electronic device 101 may determine that the new node 513 matches new card issuance, and the new node 513 may correspond to a leaf node.

In operation 605, the electronic device 101 may determine one matched leaf node as a menu for the detailed service. The electronic device 101 may determine the new node 513 as a menu of the Samsung Card customer center 501. FIG. 5 is merely an example, and the menu information may vary depending on the service provider 450.

In operation 607, the electronic device 101 may determine whether there are two matching leaf nodes, as the result of matching. When the detailed service is payment date confirmation, the electronic device 101 may match two leaf nodes to a payment date node 510 and a payment date node 511.

In operation 609, the electronic device 101 may select one of intermediate nodes, from which the leaf nodes are branched, in response to determining that two or more matching leaf nodes have been found. The electronic device 101 may identify ancestor nodes of the two or more leaf nodes, may select intermediate nodes from which the two or more leaf nodes are branched from among the ancestor nodes, and may select one from among the selected intermediate nodes. The electronic device 101 may select one from among the intermediate nodes based on user input. The electronic device 101 may display information of the intermediate nodes in order to request a user input. For example, when an account inquiry item matches two leaf nodes, and intermediate nodes, from which the two leaf nodes are branched, are a personal information change item and a payment information confirmation item, the electronic device 101 may provide text of "Please, select whether the item is an account inquiry based on personal information change or an account inquiry item based on payment information confirmation" to induce a user input.

In operation 611, the electronic device 101 may determine a lower leaf node of the selected intermediate node as the menu for the detailed service. For example, the electronic device 101 may determine, as the first menu, a leaf node matching the account inquiry item according to personal information change, in response to selection of personal information change according to the user input.

In operation 613, the electronic device 101 may determine whether there is one matching intermediate node, as a result of matching.

In operation 615, the electronic device 101 may select one from among child nodes of the matching intermediate node. The electronic device 101 may select one from among the child nodes of the intermediate nodes based on user input.

In operation 617, the electronic device 101 may determine whether the selected child node is a leaf node. The electronic device 101 may repeat operation 615 of selecting a child node until reaching the leaf node.

In operation 619, when the selected child node corresponds to a leaf node, the electronic device 101 may determine the selected child node, i.e., the corresponding leaf node, as the first menu item.

In operation 621, the electronic device 101 may determine whether there are two or more intermediate nodes, as the result of matching.

In operation 623, the electronic device 101 may select one from among the two or more intermediate nodes. With respect to the selected intermediate node, in operation 615, a child node of the intermediate node may be selected.

In operation 625, the electronic device 101 may terminate the operation without determining the first menu, in response to determining that neither a leaf node nor an intermediate node is a match according to the matching result. The electronic device 101 may display information indicating that the first menu is not specified.

Figure 7:
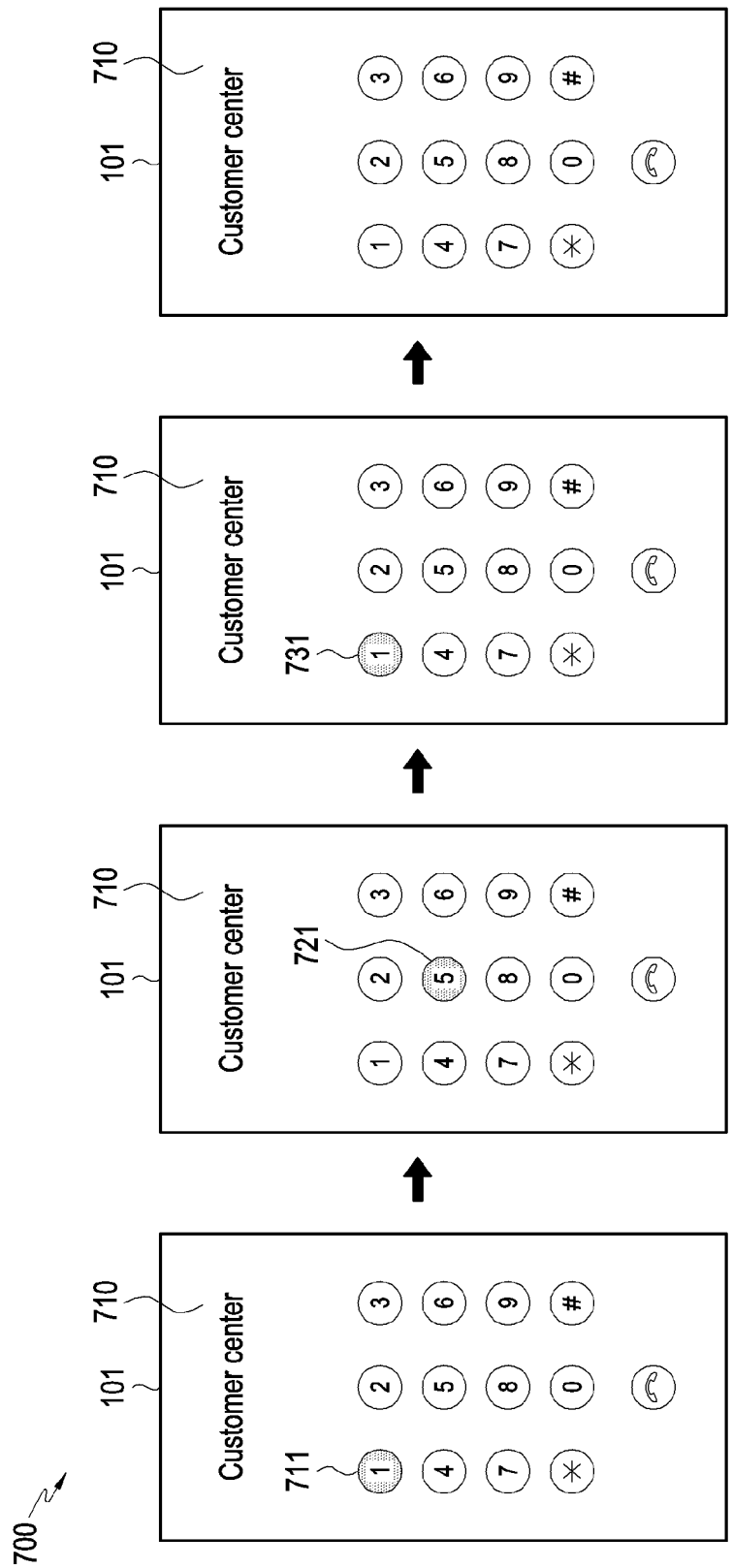
FIG. 7 illustrates a conceptual diagram for explaining an operation of transmitting, by the electronic device, a response in response to one or more voice prompts provided by the service provider according to various embodiments.

FIG. 7 illustrates conceptual diagram 700 for explaining an operation of transmitting, by the electronic device, a response to one or more voice prompts provided by a service provider according to various embodiments. After a call is connected to a service provider (e.g., the service provider 450 in FIG. 4), the electronic device 101 may transmit a response corresponding to one or more voice prompts transmitted by the service provider 450. The service provider 450 may select one of menu information according to the received response, and may determine a subsequent voice prompt. In FIG. 7, it is assumed that a detailed service is new card application, and a description thereof will be provided with reference to the menu information in FIG. 5. In response to establishment of the call connection, the service provider 450 may request to select one of information relating to child nodes until reaching a leaf node in the tree for the menu information of FIG. 5. For example, referring to FIG. 7, the electronic device 101 may display a call screen of a call with the Samsung Card customer center 501 on a touchscreen display 710 (e.g., the touchscreen display 310 in FIG. 3).

The electronic device 101 may transmit a response of pressing button 1 711 in response to a voice prompt of "Please, press 1 if you are a personal client, and press 2 if you are a corporate client" transmitted by the Samsung Card customer center 501. The Samsung Card customer center 501 may receive the response of pressing button 1 711, may identify that the user of the electronic device 101 is a personal client, and may request to select a child node of the individual 502 in FIG. 5. For example, the Samsung Card customer center 501 may transmit the voice prompts in FIG. 5, such as "Please, press 1 to report a lost card 504, press 2 for information inquiry 505, press 3 for information change 506, press 4 for card cancellation 507, press 5 for card application 508, and press 6 for attendant connection 509". For example, referring to FIG. 7, the electronic device 101 may transmit a response of pressing button 5 721 on the basis of a new card application. Subsequently, the electronic device 101 may receive a voice prompt of "Please, press 1 to apply for a new card, and press 2 for re-issuance of card" transmitted from the Samsung Card customer center 501, and may transmit a response of pressing button 1 731. The Samsung Card customer center 501 may request that the customer wait for connection to an attendant, in response to reaching the new node 513 corresponding to the detailed service, i.e., the new card application. For example, the electronic device 101 may receive one or more voice prompts from the Samsung Card customer center 501 until connection to the attendant is completed. The electronic device 101 may determine whether connection to the attendant has been completed on the basis of the received one or more voice prompts. The electronic device 101 may display the call screen on the touchscreen display 710 and wait while the attendant is being connected.

The screens shown in FIG. 7 may be executed in the background so as not to be displayed on the touchscreen display 710, or may by displayed on the touchscreen display 710 of the electronic device 101 depending on the implementation. Even in the case where screens are displayed, as shown in FIG. 7, the electronic device 101 may sequentially press button 1 711, button 5 721, and button 1 711 and wait, without user input to the displayed screen, until connection to the attendant is completed.

Figure 8:
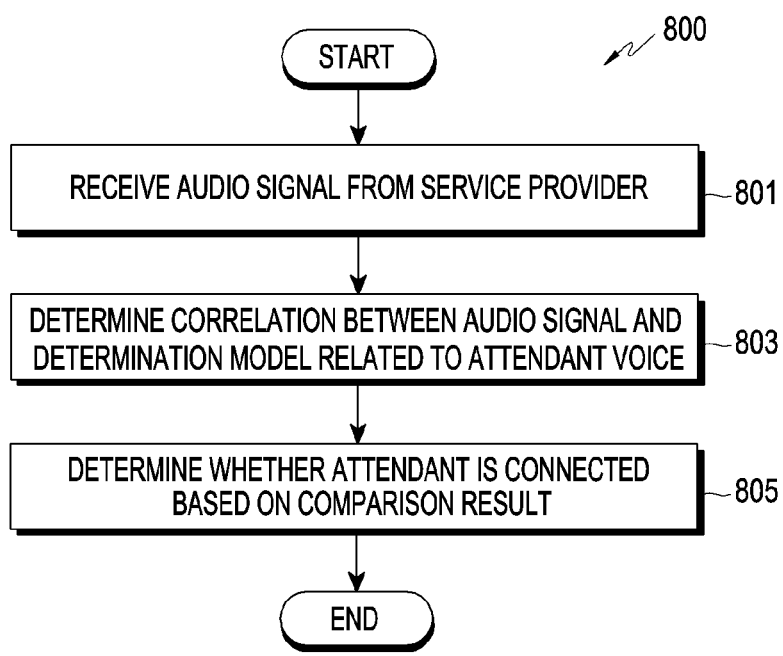
FIG. 8 illustrates a flowchart for explaining an operation of determining, by the electronic device, whether an attendant is connected according to various embodiments.

FIG. 8 illustrates a flowchart 800 for explaining an operation of determining, by the electronic device, whether an attendant is connected according to various embodiments. The electronic device 101 (e.g., the processor 120) may determine whether an attendant is connected on the basis of one or more voices transmitted by a service provider (e.g., the service provider 450 in FIG. 4). In order to discriminate an attendant voice, the electronic device 101 may use a determination model for the attendant voice.

In operation 801, the electronic device 101 may receive an audio signal from the service provider 450. For example, the electronic device 101 may receive, from the service provider 450, an audio signal generated by a machine (or pre-stored and output thereby) or an audio signal generated by an attendant. For example, an audio signal generated by a machine may be an audio signal provided by an ARS.

In operation 803, the electronic device 101 may determine a correlation between the received audio signal and the determination model related to the attendant voice. The electronic device 101 may use, as the determination model, a learned deep-learning model with respect to multiple audio signals related to attendant voice. The electronic device 101 may extract characteristics from the multiple audio signals related to the attendant voice, and may use, as the determination model, a machine-learning model for the extracted characteristics. For example, the electronic device 101 may extract, as the audio signal characteristics, a zero crossing rate, energy, entropy of energy, spectral centroid/spread/entropy/flux/rolloff, Mel Frequency Cepstral Coefficients (MFCCs), or Chroma vector/deviation, and may use the same.

In operation 805, the electronic device 101 may determine whether an attendant is connected on the basis of the comparison result. For example, when the correlation with the determination model for the audio signal shows similarity and has a value equal to or greater than a threshold value, the electronic device 101 may determine that an attendant is connected.

Figure 9:
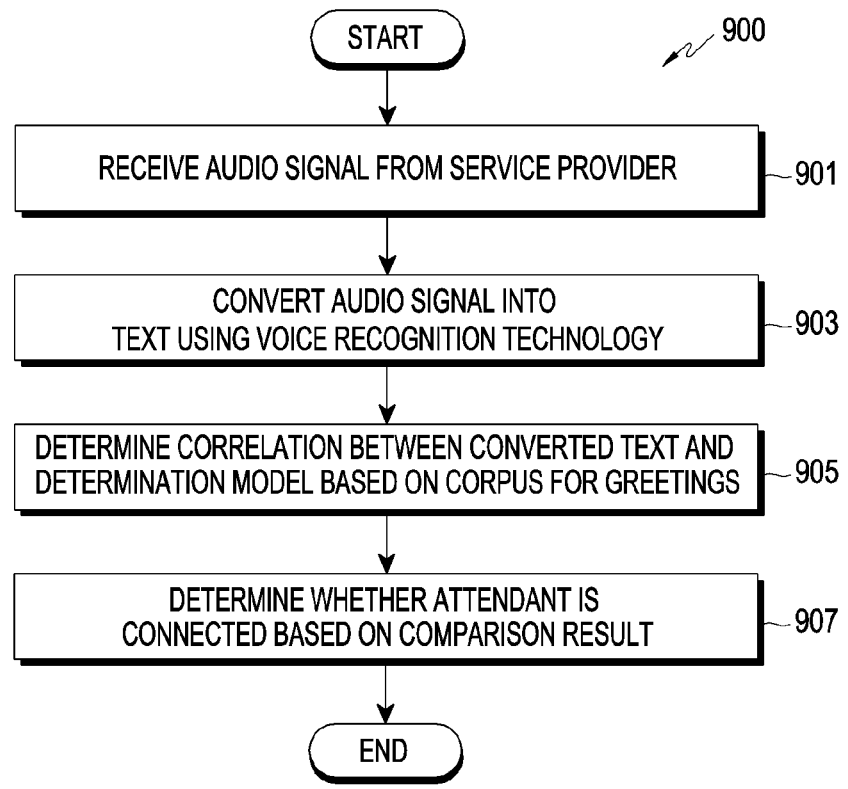
FIG. 9 illustrates a flowchart for explaining an operation of determining, by the electronic device, whether an attendant is connected according to various embodiments.

FIG. 9 illustrates a flowchart 900 for explaining an operation of determining, by the electronic device, whether an attendant is connected according to various embodiments. The electronic device 101 (e.g., the processor 120 or 210) may determine whether an attendant is connected on the basis of one or more transmitted by a service provider (e.g., the service provider 450 in FIG. 4). In order to distinguish an attendant voice, the electronic device 101 may convert the attendant voice into text, and may determine the similarity between the converted text and greetings that may be uttered when an attendant is connected.

In operation 901, the electronic device 101 may receive an audio signal from the service provider 450. The service provider 450 may transmit an announcement indicating a waiting state for connection to an attendant until connection to the attendant is completed. The service provider 450 may transmit an attendant voice when connection to the attendant is completed. For example, after connection to an attendant, the attendant may utter a message indicating that connection to the attendant has been completed, such as "Hello, this is Samsung Card customer center attendant OOO".

In operation 903, the electronic device 101 may convert an audio signal into text using a voice recognition technology.

In operation 905, the electronic device 101 may determine a correlation between the converted text and a determination model for corpus for greetings. The electronic device 101 may store the corpus for greetings provided by the service provider 450, and may use a learning model for the corpus.

In operation 907, the electronic device 101 may determine whether an attendant is connected on the basis of the comparison result. For example, when the correlation between the converted text and the corpus for the determination model has a value higher than the threshold value, the electronic device 101 may determine that an attendant is connected.

According to various embodiments, the electronic device 101 may determine whether an attendant is connected, using at least one among the method, shown in FIG. 8, of using the determination model related to an attendant voice and the method, shown in FIG. 9, of using the determination model related to the corpus of greetings. The electronic device 101 may assign a weight value to the at least one method and may finally determine whether an attendant is connected in consideration of a value calculated according to the weighted value.

Figures 10A, 10B:
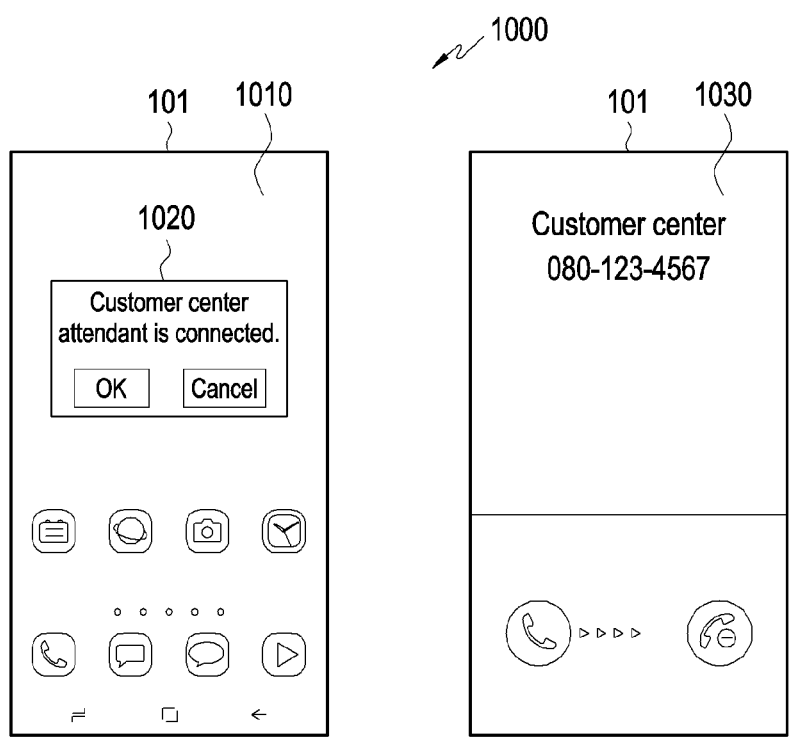
FIG. 10A illustrates various conceptual diagrams for providing a notification, which indicates connection to the attendant, by the electronic device according to various embodiments.
FIG. 10B illustrates various conceptual diagrams for providing a notification, which indicates connection to the attendant, by the electronic device according to various embodiments.

FIG. 10A illustrates various conceptual diagrams 1000 for providing a notification, which indicates connection to an attendant, by the electronic device according to various embodiments, and FIG. 10B illustrates various conceptual diagrams 1000 for providing a notification, which indicates connection to an attendant, by the electronic device according to various embodiments. The electronic device 101 (e.g., the processor 120) may execute call connection to a service provider (e.g., the service provider 450 in FIG. 4) in the background and may display one among one or more applications being executed on a touchscreen display 1010 (e.g., the touchscreen display 310 in FIG. 3 or the touchscreen display 710 in FIG. 7). As shown in FIG. 10A, when the touchscreen display 1010 is operating, the electronic device 101 may provide, via a pop-up window 1020, a notification indicating connection to an attendant. The pop-up window 1020 may include text indicating that an attendant has been connected.

As shown in FIG. 10B, the electronic device 101 may execute call connection to the service provider 450 in the background and may provide, in a state where the touchscreen display 1010 is not operating, a notification indicating connection to an attendant on a screen 1030 that displays a notification of an incoming call.

Figure 11:
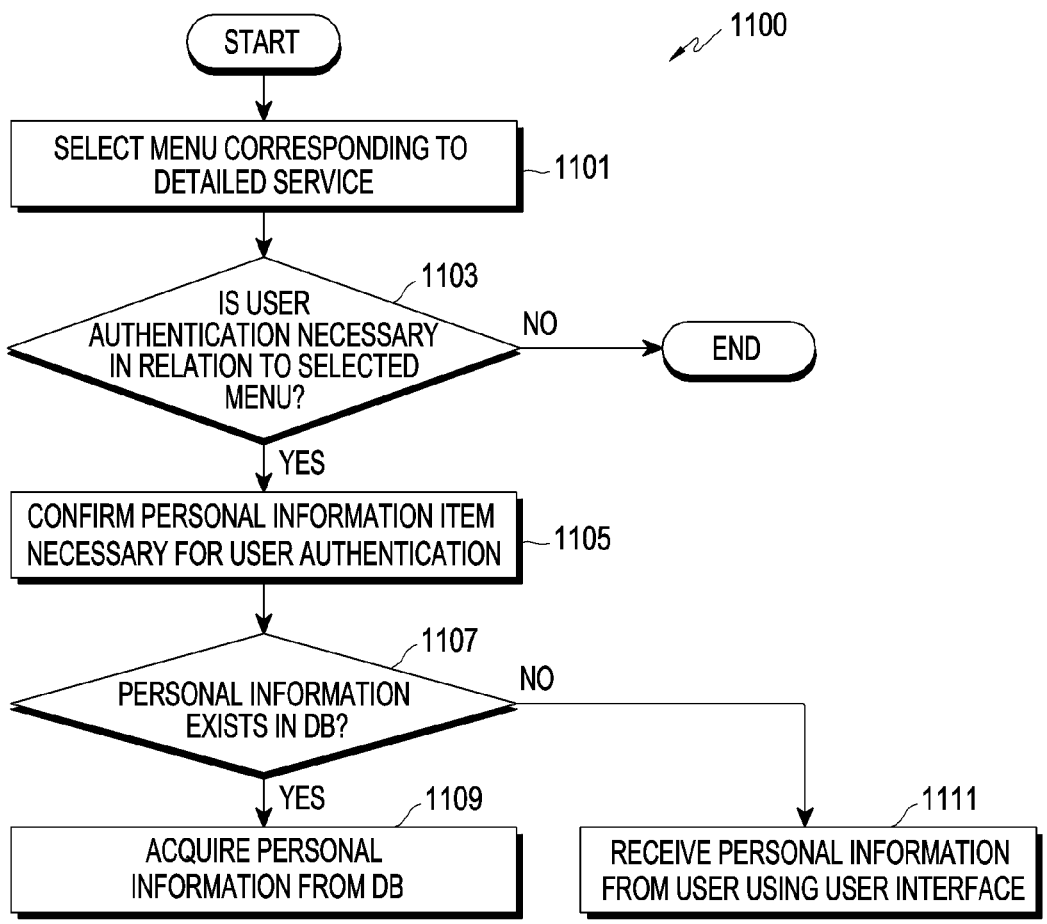
FIG. 11 illustrates a flowchart for explaining an operation of checking user information of the electronic device according to various embodiments.

FIG. 11 illustrates a flowchart 1100 for explaining an operation of checking user information of the electronic device according to various embodiments. The electronic device 101 (e.g., the processor 120) may provide user information when user authentication including the user information is necessary in order to use a menu of a service provider (e.g., the service provider 450 in FIG. 4). The electronic device 101 may store the user information for a user authentication procedure and may respond using the user information stored in the user authentication procedure.

In operation 1101, the electronic device 101 may select a menu corresponding to a detailed service from a menu provided by the service provider 450. For example, the electronic device 101 may select a payment amount inquiry menu in response to a user utterance of "What is the payment amount for this month?".

In operation 1103, the electronic device 101 may determine whether user authentication is necessary in relation to the selected menu. The user authentication may include requesting, from the electronic device 101, user information of at least one electronic device 101. For example, the service provider 450 may request a user name, a mobile phone number, a card number, and a card password in order to provide a payment amount inquiry service. The electronic device 101 may check whether the user authentication is included on the basis of information on the menu provided by the service provider 450.

In operation 1105, the electronic device 101 may check an individual information item necessary for user authentication. The electronic device 101 may check user authentication specified in the selected menu and may check the individual information item used by user authentication. For example, the necessary individual information item may include a user name, a mobile phone number, a card number, and a card password.

In operation 1107, the electronic device 101 may determine whether personal information is stored in a database DB stored in the memory 130. The personal information may be stored in a secured area, and additional user authentication may be necessary in order for the electronic device 101 to acquire the personal information from the database.

In operation 1109, when the necessary personal information is stored in the database, the electronic device 101 may acquire the personal information from the database. For example, the electronic device 101 may request a user to input a preset password in order to acquire the personal information stored in the database.

In operation 1111, when the necessary personal information is not in the database, the electronic device 101 may receive the personal information from the user through a user interface. The electronic device 101 may display the personal information item via the user interface and may receive content corresponding to the personal information item based on user input.

Figure 12:
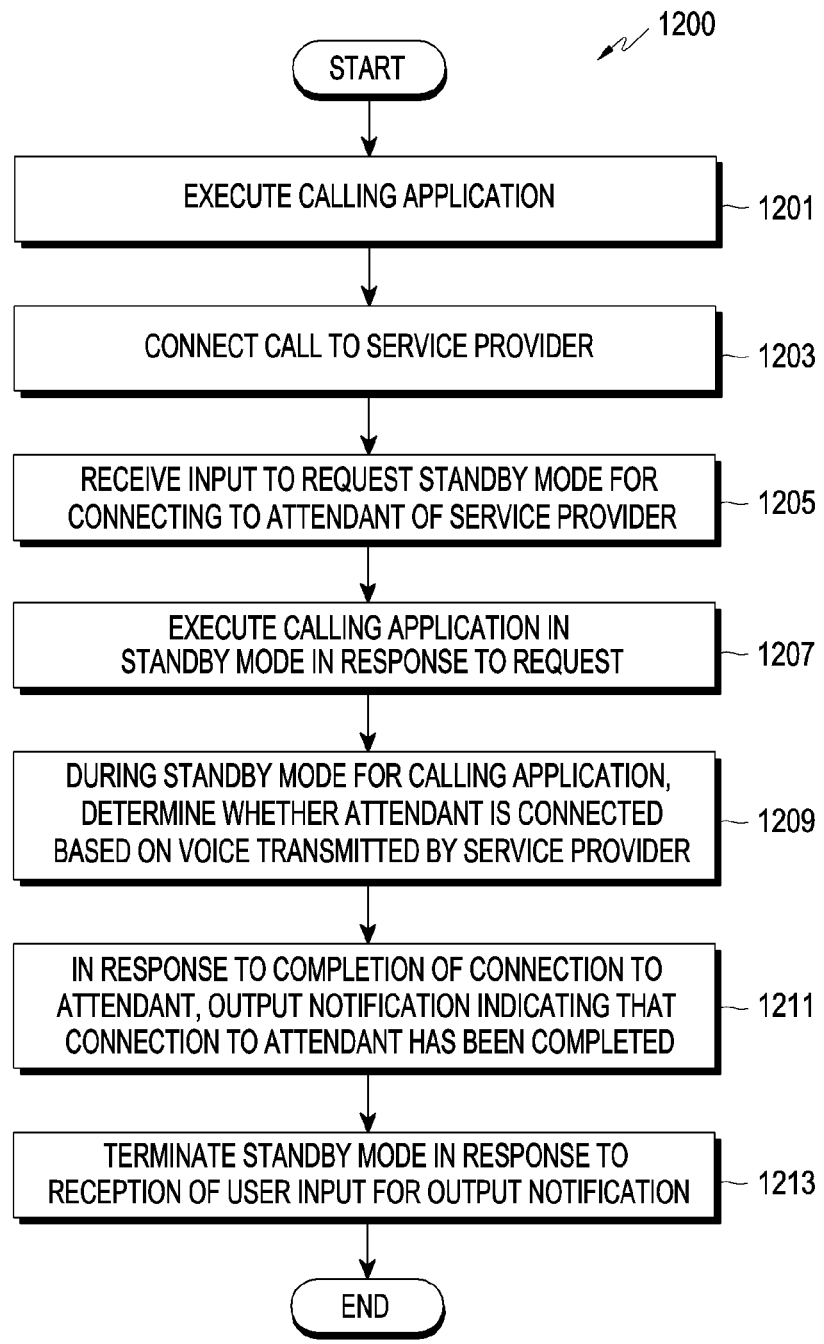
FIG. 12 illustrates a flowchart for explaining an operation method of the electronic device according to various embodiments.

FIG. 12 illustrates a flowchart 1200 for explaining an operation method of an electronic device according to various embodiments. The electronic device 101 (e.g., the processor 120) may execute a calling application in a standby mode until connection to an attendant is completed in response to a user request during a call with a service provider (e.g., the service provider 450 in FIG. 4).

In operation 1201, the electronic device 101 may execute a calling application based on user input. For example, the electronic device 101 may execute the calling application in response to touch input of selecting an icon for execution of the calling application.

In operation 1203, the electronic device 101 may connect a call with the service provider 450 in response to the user input. For example, the electronic device 101 may attempt to connect a call to a customer center (the service provider 450) in response to a touch input of sequentially pressing buttons corresponding to a phone number of the customer center in button icons provided by the calling application.

In operation 1205, the electronic device 101 may receive an input to request the standby mode for connection to an attendant of the service provider 450. For example, the electronic device 101 may display, on a call screen, an icon for receiving a request for executing the calling application in the standby mode and may receive a standby mode request in response to reception of user touch input on the icon.

In operation 1207, the electronic device 101 may execute the calling application in the standby mode in response to the request. The electronic device 101 may execute the calling application in the standby mode in the background. The electronic device 101 may not display an execution screen (e.g., a call screen) of the calling application in the standby mode on a touchscreen display (e.g., the touchscreen display 310 in FIG. 3, the touchscreen display 710 in FIG. 7, or the touchscreen display 1010 in FIG. 10A), and may display, on a part of the touchscreen display 310, an indicator (or an icon) indicating that the calling application is being executed in the background. The electronic device 101 may limit the function of the speaker 155 or the microphone 150 during the standby mode of the calling application. When the function of the speaker 155 or the microphone 150 is limited, the electronic device 101 may output sound, during the standby mode of the calling application, using the speaker 155 according to execution of another application, and may process a signal input through the microphone 150 according to execution of the another application. The electronic device 101 may execute the calling application in the standby mode so that a user may use another application of the electronic device 101 without being restricted by the execution of the calling application.

In operation 1209, during the standby mode for the calling application, the electronic device 101 may determine whether an attendant is connected on the basis of a voice signal transmitted by the service provider 450. For example, the electronic device 101 may receive the voice transmitted by the service provider 450 and may determine a correlation between the received voice and a determination model for an attendant voice so as to determine, as the result of the determination, whether an attendant is connected.

In operation 1211, in response to completion of connection to an attendant, the electronic device 101 may output a notification indicating that the attendant has been connected. The electronic device 101 may visually provide, via the touchscreen display 310, information indicating completion of connection to an attendant, or may output, via the speaker, a designated sound indicating completion of connection to the attendant. The electronic device 101 may configure the notification of completion of connection to the attendant to be output using one or more pieces of hardware included in the electronic device 101. Alternatively, the electronic device 101 may transmit the notification of completion of connection to the attendant to another electronic device connected to the electronic device 101 so that the another electronic device may output information on the notification of completion of connection to the attendant.

In operation 1213 the electronic device 101 may terminate the standby mode in response to reception of user input for the output notification. In response to the user input received via the touchscreen display 310, the electronic device 101 may terminate the standby mode of the calling application and may display a call screen of the calling application on the touchscreen display 310.

Figure 13:
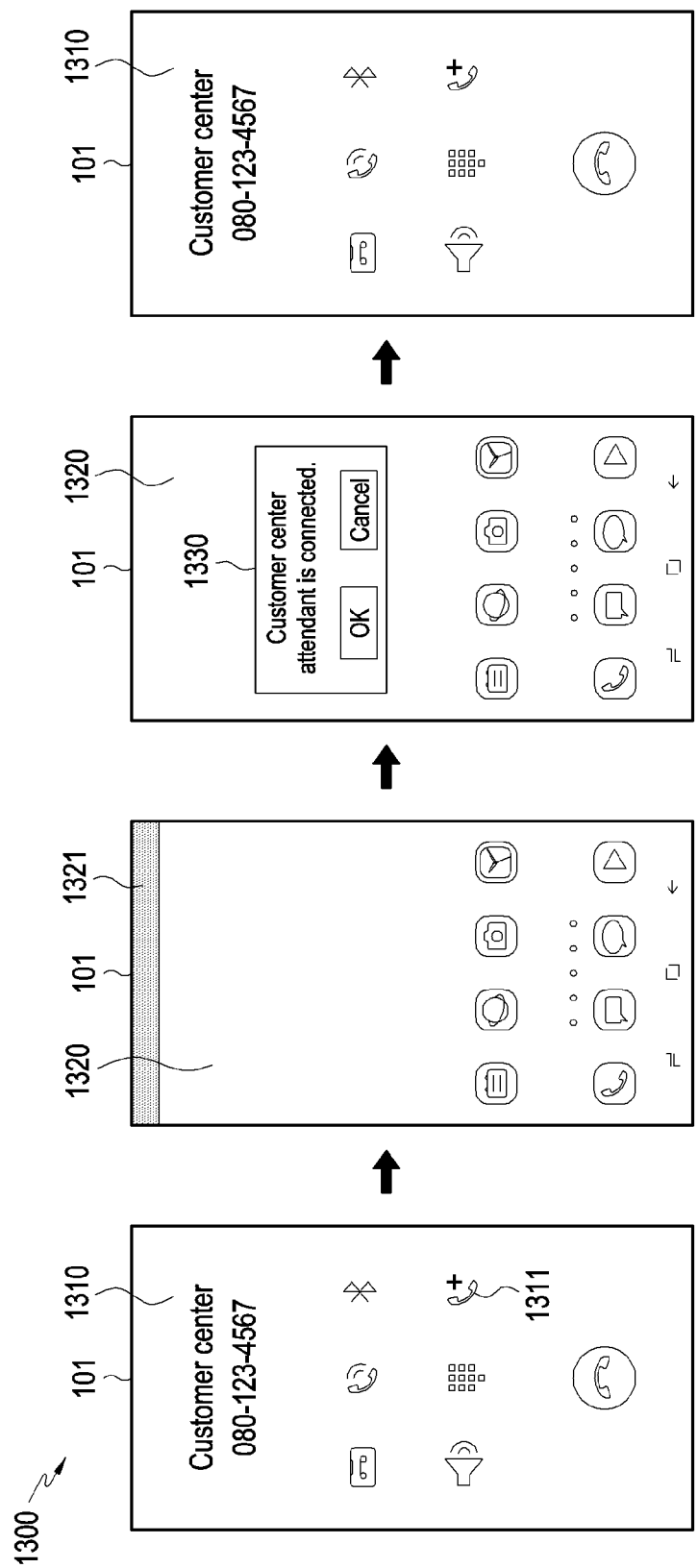
FIG. 13 illustrates conceptual diagrams for explaining a standby mode of the electronic device to be connected to an attendant according to various embodiments.

FIG. 13 illustrates conceptual diagrams 1300 for explaining a standby mode of the electronic device to be connected to an attendant according to various embodiments. The electronic device 101 (e.g., the processor 120) may display an execution screen 1310 of the calling application. The execution screen 1310 of the calling application may include an icon 1311 corresponding to a function to request a standby mode for connection to an attendant. The electronic device 101 may switch the mode of the calling application to the standby mode and may execute the calling application in the background in response to reception of touch input for the icon 1311. The electronic device 101 may display, during the standby mode of the calling application, an execution screen of at least one other application being executed in a touchscreen display (e.g., the touchscreen display 310 in FIG. 3, the touchscreen display 710 in FIG. 7, or the touchscreen display 1010 in FIG. 10A) and may display, for example, a launcher application execution screen 1320. The electronic device 101 may display, during the standby mode of the calling application, an indicator 1321 indicating that the calling application is in the standby mode. The indicator 1321 may correspond to semi-transparent display of a color designated in a partial area of the touch screen display 310. The electronic device 101 may display, using a pop-up window 1330, a notification indicating completion of connection to the attendant over at least a part of an execution screen 1320 of other applications in response to the determination that the attendant has been connected to the attendant. The electronic device 101 may terminate the standby mode of the calling application and may re-display the call screen 1310 of the calling application, in response to the user input for the pop-up window 1330 notification indicating completion of connection to the attendant.

Figure 14:
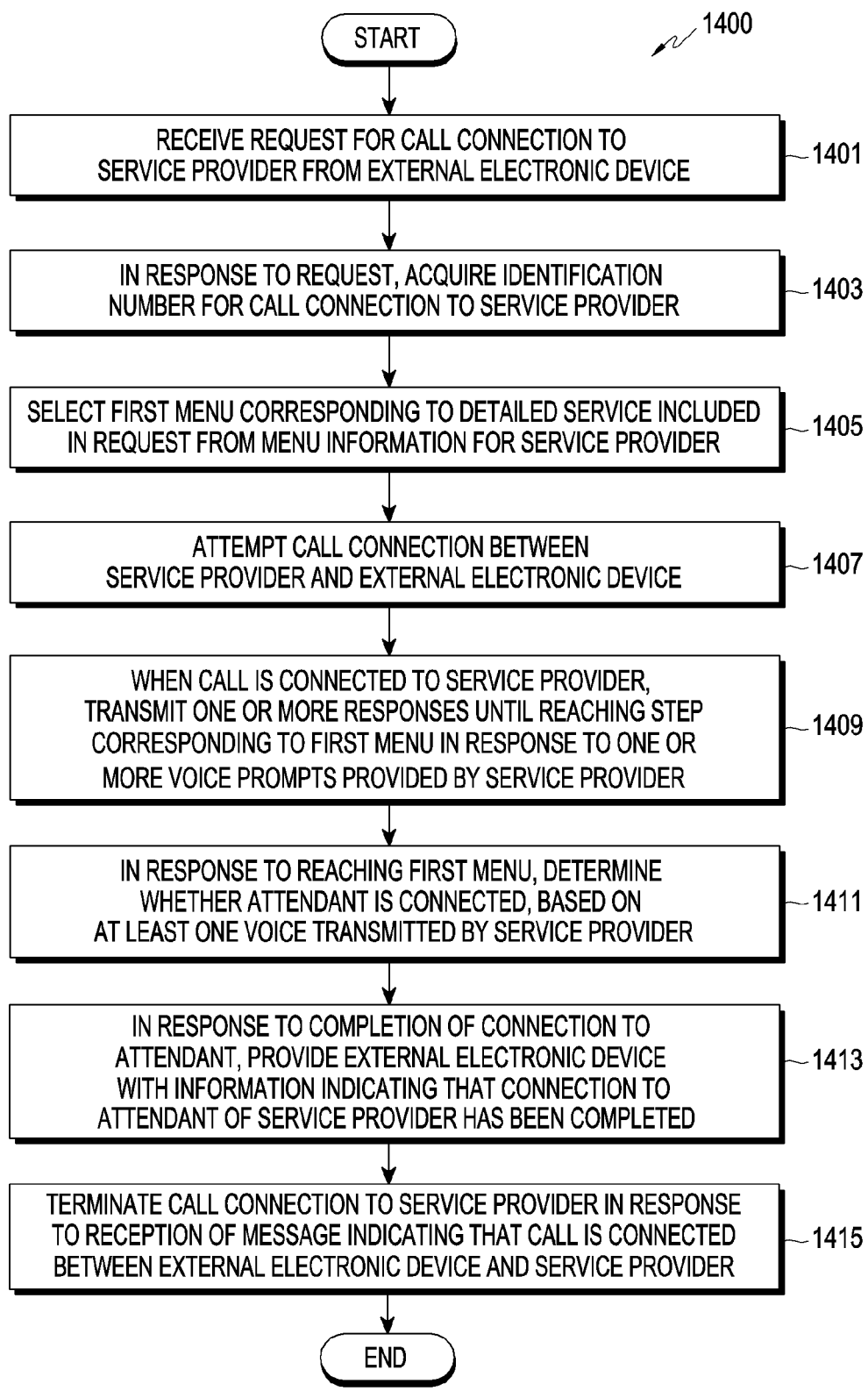
FIG. 14 illustrates a flowchart for explaining an operation method of the electronic device according to various embodiments.

FIG. 14 illustrates a flowchart 1400 for explaining an operation method of an electronic device according to various embodiments. The electronic device 101 (e.g., the processor 120) may perform task connection including call connection between another electronic device and a service provider (e.g., the service provider 450 in FIG. 4) in response to a request of the another electronic device.

In operation 1401, the electronic device 101 may receive a request for call connection to the service provider 450 from an external electronic device (e.g., the electronic device 102 or 104 in FIG. 1). Here, the request may include user information of the external electronic device 102 or 104 and at least one piece of keyword information related to a detailed service and the service provider 450.

In operation 1403, the electronic device 101 may acquire an identification number for call connection to the service provider 450 in response to the request. The electronic device 101 may acquire, as the identification number, a phone number for connection to the service provider 450.

In operation 1405, the electronic device 101 may select a first menu item, corresponding to the detailed service included in the request, from menu information including one or more detailed services provided by the service provider 450. The electronic device 101 may select the first menu item corresponding to the detailed service using at least one piece of received keyword information. For example, the electronic device 101 may select a menu corresponding to new card issuance provided by the Samsung Card customer center (e.g., the Samsung Card customer center 501 in FIG. 5) using a keyword "applying for a card".

In operation 1407, the electronic device 101 may attempt a call connection between the service provider 450 and the external electronic device 102 or 104. The electronic device 101 may call the identification number of the service provider 450, and may transmit user information of the external electronic device 102 or 104 in response to a request for user information.

In operation 1409, when the call to the service provider 450 is connected, the electronic device 101 may transmit one or more responses until reaching a step corresponding to the first menu in response to one or more voice prompts provided by the service provider 450. The electronic device 101 may determine respective responses to the one or more voice prompts on the basis of the user information of the external electronic device 102 or 104 and information of the first menu and may transmit the determined responses. For example, the electronic device 101 may transmit a response of pressing a button until reaching a menu step corresponding to the first menu according to an announcement transmitted by the service provider 450.

In operation 1411, the electronic device 101 may determine whether an attendant is connected, on the basis of at least one voice transmitted by the service provider 450, in response to reaching the first menu. The electronic device 101 may determine correlation with the received voice by using the determination model related to an attendant voice and may determine whether an attendant is connected based on the determination result.

In operation 1413, in response to completion of connection to an attendant, the electronic device 101 may provide the external electronic device 102 or 104 with information indicating completion of connection to the attendant of the service provider 450. The electronic device 101 may further provide information enabling inducement of the call connection between the service provider 450 and the external electronic device 102 or 104. The external electronic device 102 or 104 may receive the information from the electronic device 101 and may perform a task for call connection to the service provider 450.

In operation 1415, the electronic device 101 may terminate the call connection to the service provider 450 in response to reception of a message indicating that the call is connected between the external electronic device 102 or 104 and the service provider 450. The external electronic device 102 or 104 may perform call connection to the service provider 450 according to information provision by the electronic device 101, and when the call connection is completed, the external electronic device 102 or 104 may transmit a message indicating call connection to the electronic device 101. The electronic device 101 may determine that the call is connected between the external electronic device 102 or 104 and the service provider 450 in response to reception of the message, and may terminate the call connection to the service provider 450.

Figure 15A:
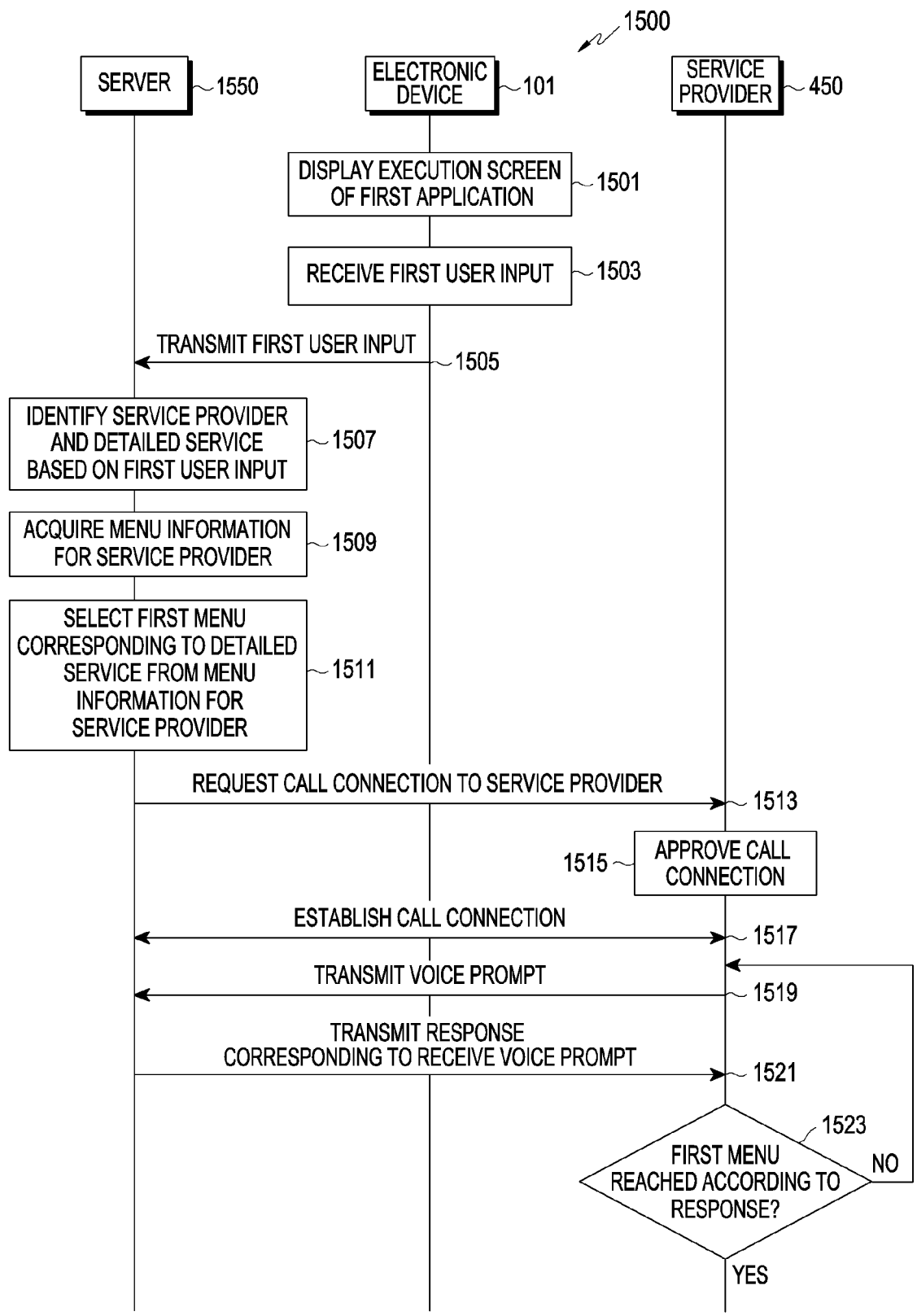
FIG. 15A illustrates a flowchart for explaining the operation of a server, the electronic device, and the service provider according to various embodiments.
Figure 15B:
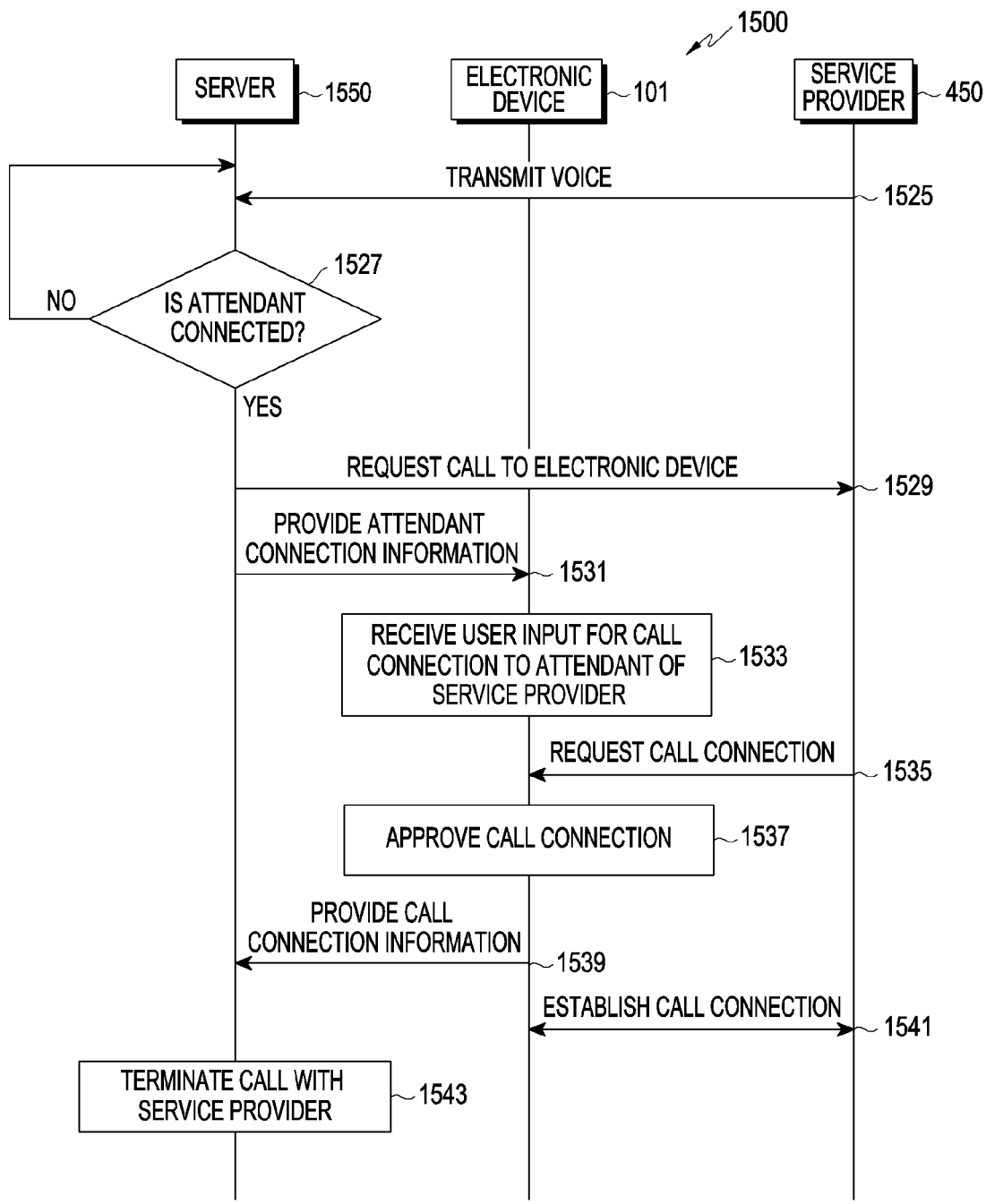
FIG. 15B illustrates a flowchart for explaining the operation of the server, the electronic device, and the service provider according to various embodiments.

FIG. 15A illustrates a flowchart 1500 for explaining the operation of a server, the electronic device, and a service provider according to various embodiments, and FIG. 15B illustrates a flowchart 1500 for explaining the operation of the server, the electronic device, and the service provider according to various embodiments. According to various embodiments, a server 1550 (e.g., the server 108 in FIG. 1) may receive a request for call connection between the electronic device 101 (e.g., the processor 120) and the service provider 450 from the electronic device 101 and may perform the call connection between the electronic device 101 and the service provider 450.

In operation 1501, the electronic device 101 may display an execution screen of a first application. The first application may be a voice recognition app. The electronic device 101 may execute a voice recognition app to process a user utterance and may display the execution screen to induce a user input.

In operation 1503, the electronic device 101 may receive a first user input. For example, the electronic device 101 may receive a user utterance through the microphone 150 and may display a voice recognition result on the execution screen in response to reception of the user utterance.

In operation 1505, the electronic device 101 may transmit the first user input to the server 1550. The electronic device 101 may transmit, to the server 1550, the first user input in order to request a task including call connection to the service provider 450. The first user input may include requesting a call with the service provider 450. For example, the first user input may be "Apply for a new card in the Samsung Card customer center".

In operation 1507, the server 1550 may identify the service provider 450 and a detailed service on the basis of the received first user input. The service provider 450 may provide various services via call connection. The detailed service may be one of services provided by the service provider 450. The server 1550 may extract at least one keyword related to the detailed service or the service provider 450 from the first user input and may identify the detailed service and the service provider 450 by using the at least one keyword. For example, the server 1550 may extract keywords, such as "Samsung Card", "customer center", "new card", and "apply", from "Apply for a new card in the Samsung Card customer center", and may identify the Samsung Card customer center 501 as the service provider 450 by using "Samsung Card" and "customer center". The server 1550 may identify new card issuance as the detailed service by using "new card" and "apply".

In operation 1509, the server 1550 may acquire menu information for the service provider 450. The menu information may include information on one or more services provided by the service provider 450, may be stored in a tree structure, and may include user information and information of whether an attendant is connected, etc. which are used in order to provide each service.

In operation 1511, the server 1550 may select a first menu corresponding to the detailed service from the menu information for the service provider 450. For example, the server 1550 may select a card application menu of the Samsung Card customer center 501 in response to new card issuance.

In operation 1513, the server 1550 may request call connection from the service provider 450.

In operation 1515, the service provider 450 may approve the call connection to the server 1550.

In operation 1517, the call connection between the server 1550 and the service provider 450 may be established.

In operation 1519, the service provider 450 may transmit, to the server 1550, a determined voice prompt according to the call connection.

In operation 1521, the server 1550 may transmit a response corresponding to the received voice prompt on the basis of information of the electronic device 101, user information of the electronic device 101, and information of the first menu item. For example, the server 1550 may transmit a phone number of the electronic device 101 in response to a voice prompt for requesting to enter a mobile phone number as the user information.

In operation 1523, the service provider 450 may determine whether the first menu has been reached on the basis of the received response. The service provider 450 may provide voice prompts in a determined order to identify a service used by a user from among provided services and may select a menu according to a response thereto. The service provider 450 may transmit voice prompts until reaching the first menu and may repeat an operation of receiving a response thereto.

In operation 1525, the service provider 450 may transmit a voice associated with connection to an attendant, which is transmitted by the service provider 450, in response to reaching the first menu. The service provider 450 may perform connection to an attendant in response to reaching the first menu. The service provider 450 may transmit an attendant upon connection to the attendant. While waiting for connection to an attendant, the service provider 450 may transmit a voice indicating a state of waiting for connection to an attendant.

In operation 1527, the server 1550 may determine whether an attendant is connected on the basis of the voice transmitted by the service provider 450. The server 1550 may receive the voice transmitted from the service provider 450 and may repeat an operation of determining whether an attendant is connected, until connection to an attendant is completed.

In operation 1529, the server 1550 may request the service provider 450 to call the electronic device 101 in response to determining that an attendant has been connected. For example, the server 1550 may transmit a message for requesting the service provider 450 to call the electronic device 101.

In operation 1531, the server 1550 may provide the electronic device 101 with information indicating that connection to an attendant has been completed. Operation 1531 may be performed before operation 1529.

In operation 1533, the electronic device 101 may receive user input for call connection to an attendant of the service provider 450. For example, the electronic device 101 may receive user input of touching a notification displaying information received from the server 1550 and may perform call connection to the service provider 450.

In operation 1535, the service provider 450 may request call connection from the electronic device 101 according to the request of the server 1550. Operation 1535 may precede operation 1533 or operation 1531.

In operation 1537, the electronic device 101 may approve the call connection request transmitted by the service provider 450.

In operation 1539, the electronic device 101 may provide the server 1550 with information indicating the call connection to the service provider 450.

In operation 1541, the electronic device 101 may establish call connection to the service provider 450.

In operation 1543, the server 1550 may terminate the call with the service provider 450 on the basis of receiving, from the electronic device 101, information about call connection to the service provider 450.

Figure 16:
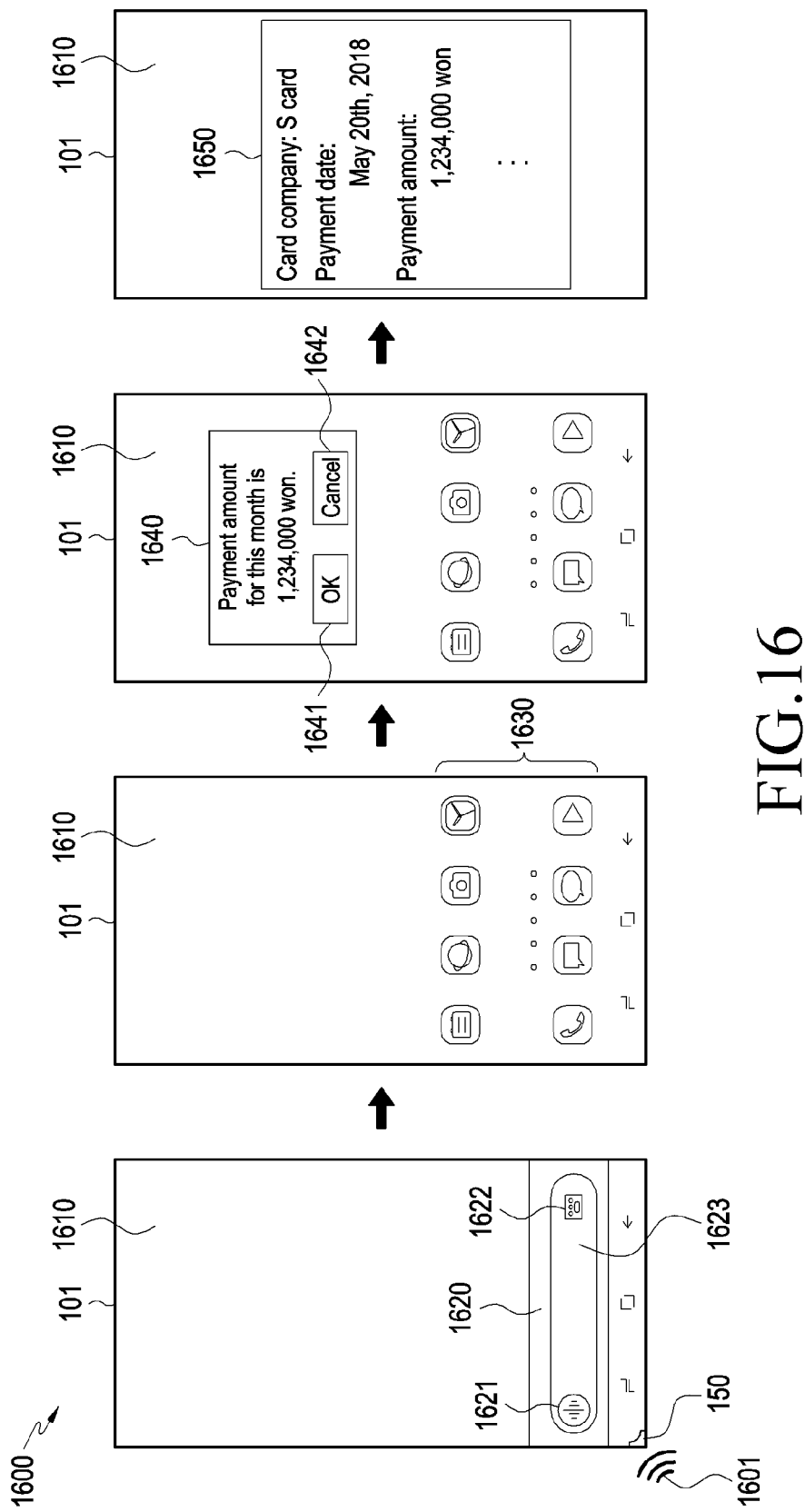
FIG. 16 illustrates conceptual diagrams for explaining information provision according to a user utterance by the electronic device according to various embodiments.

FIG. 16 illustrates conceptual diagrams 1600 for explaining information provision according to a user utterance by the electronic device according to various embodiments. The electronic device 101 (e.g., the processor 120) may process a task included in a user utterance for requesting a service provided by a service provider (e.g., the service provider 450 in FIG. 4) via call connection. While processing one or more tasks included in the user utterance, the electronic device 101 may perform call connection to the service provider 450 and may provide a user with information acquired via the call connection.

The electronic device 101 may display an execution screen 1620 for receiving a user utterance 1601 in a touch-screen display 1610 (e.g., the touchscreen display in FIG. 3, the touchscreen display 710 in FIG. 7, or the touchscreen display 1010 in FIG. 10A). For example, the electronic device 101 may display the execution screen 1620 according to execution of a voice recognition app. The execution screen 1620 may include an indicator 1621 indicating that listening is being performed, an OK icon 1622, and a text display window 1623. The electronic device 101 may activate the microphone 150, and may display, for example, the indicator 1621 indicating that listening is being performed. The electronic device 101 may input text or a command acquired as a result of processing the user utterance into the text window 1623 so as to display the same. When the OK icon 1622 is selected, the electronic device 101 may perform a task corresponding to the text or command within the text display window 1623. For example, the electronic device 101 may receive a user utterance 1601 of "How much is the Samsung Card payment this month?" through the microphone 150. The electronic device 101 may display text indicating "How much is the Samsung Card payment this month?" within the text display window 1623, and when the OK icon 1622 is selected, the electronic device 101 may perform a task included in "How much is the Samsung Card payment this month?". According to the voice recognition analysis result, the electronic device 101 may confirm multiple tasks for performing at least one operation for reaching steps of executing the calling application, inputting a phone number corresponding to Samsung Card or connecting a call to Samsung Card, and confirming a payment amount after connecting the call. For example, the electronic device 101 may directly confirm the multiple tasks or may receive the multiple tasks from a server 108 for voice recognition analysis. Hereinafter, confirmation of specific information including the multiple tasks by the electronic device 101 may be understood as confirmation of the specific information on the basis of information received from the server 108.

The electronic device 101 may stop displaying the execution screen 1620 in response to selection of the OK icon 1622. According to the stoppage of displaying the execution screen 1620, at least one screen displayed prior to display of the execution screen 1620 may be displayed on the touchscreen display 1610. For example, an execution screen 1630 of a launcher application may be displayed.

The electronic device 101 may identify the service provider 450 and a detailed service on the basis of the user utterance 1601. The electronic device 101 may select a menu of the service provider 450 corresponding to the detailed service. In order to request a service for the selected menu from the service provider 450, the electronic device 101 may execute a calling application for connection of a call to the service provider 450. The electronic device 101 may request a service for the menu during call connection to the service provider 450 and may receive payment amount information as a service result from the service provider 450.

The electronic device 101 may provide the service result corresponding to the user utterance 1601 to the touchscreen display 1610 in a pop-up window 1640. The electronic device 101 may display an OK icon 1641 and a cancel icon 1642 in the pop-up window 1640. The electronic device 101 may display a screen 1650 that provides a service result in the touchscreen display 1610 in response to a touch input for the OK icon 1641.

An electronic device (e.g., the electronic device 101 in FIG. 1) according to various embodiments may include: a microphone (an input device 150); a speaker (a voice output device 155); a touchscreen display (e.g., a display device 160); a communication circuit (e.g., a communication module 190); at least one processor (e.g., the processor 120) operatively connected to the microphone 150, the speaker 155, the touchscreen display 160, and the communication circuit 190; and a memory (e.g., the memory 130) operatively connected to the processor 120, wherein the memory 130 stores instructions configured to, when executed, cause the at least one processor 120 to: receive a first user input through the touchscreen display 160 or the microphone 150; identify a service provider and a detailed service on the basis of at least a part of the first user input; select a first menu corresponding to the detailed service from menu information including at least one detailed service provided by the service provider; attempt to connect a call to the service provider using the communication circuit 190; when the call to the service provider is connected, transmit one or more responses until reaching a step corresponding to the first menu, in response to one or more voice prompts provided by the service provider; in response to reaching the first menu, determine whether an attendant is connected, on the basis of at least one voice transmitted by the service provider; in response to completion of connection to the attendant, output a notification indicating that connection to the attendant has been completed, using the speaker 155 or the touchscreen display 160; and in response to reception of a second user input for the output notification, display a screen for a call with the service provider. According to an embodiment, as at least a part of selecting a first menu corresponding to the detailed service from menu information including one or more services provided by the service provider, the processor 120 may use the communication circuit 190 to request the menu information from an external server 108, and may use the communication circuit 190 to receive the menu information from the external server 108. In an embodiment, the menu information may include information of one or more services provided by the service provider in a tree structure. According to an embodiment, in response to the detailed service, the processor 120 may select, as the first menu, one among one or more services located in leaf nodes in the tree structure. In the embodiment, in response to matching of the detailed service with a second menu located in intermediate nodes in the tree structure, the processor 120 may display, via the touchscreen display 160, information of a parent node or a child node of the second menu, and may select the first node located in leaf nodes among tree nodes in response to the detailed service on the basis of a third user input received in response to the displayed information. According to an embodiment, as at least a part of determining whether an attendant is connected, on the basis of at least one voice transmitted by the service provider, the processor 120 may use a first voice of the at least one received voice and a determination model obtained by learning an attendant voice, so as to compare to determine whether the first voice is similar to the determination model by a threshold value or greater. According to an embodiment, as at least a part of determining whether an attendant is connected, on the basis of at least one voice transmitted by the service provider, the processor 120 may extract at least one audio characteristic from the first voice, and may compare, using a determination model obtained by learning the audio characteristic extracted from the attendant voice, to determine whether the first voice signal is similar to the determination model by the threshold value or greater. According to an embodiment, as at least a part of determining whether an attendant is connected, on the basis of at least one voice transmitted by the service provider, the processor 120 may convert a first voice of the received at least one voice signal into text, and may determine a correlation between the converted text and a determination model obtained based on a learning corpus for designated greetings, and when the correlation has a value equal to the threshold value or greater, it may be determined that the first voice signal corresponds to the attendant voice. According to an embodiment, as at least a part of transmitting one or more responses until reaching a step corresponding to the first menu, in response to one or more voice prompts provided by the service provider, the processor 120 may receive a voice prompt that requests user information of the electronic device from the service provider, and the processor 120 may transmit, to the service provider, a response generated based on the user information of the electronic device. According to an embodiment, the processor 120 may determine, in response to selection of the first menu item, whether the service provider requests the user information of the electronic device 101, in order to provide the first menu item, and the processor 120 may acquire the user information before attempting to connect a call to the service provider in response to requesting the user information of the electronic device 101. According to an embodiment, the processor 120 may perform the call connection in the background until the second user input is received. According to an embodiment, the processor 120 may extract at least one keyword related to the service provider and the detailed service from the first user input, and may select a service provider corresponding to the at least one keyword from among multiple service providers, each of the multiple service providers providing one or more service via call connection, and the processor 120 may acquire an identification number for connecting a call to the service provider. According to an embodiment, after outputting a notification indicating that connection to an attendant is completed, before receiving the second user input for the output notification, the processor 120 may transmit, to the service provider, a message for requesting that the connection with the attendant of the service provider be maintained. According to an embodiment, the processor 120 may estimate the time required for the connection to an attendant, and may provide information of the estimated time via the touchscreen display.

An electronic device (e.g., the electronic device 101 in FIG. 1) according to various embodiments may include: a speaker (e.g., a voice output device 155), a touchscreen display (e.g., a display device 160); a communication circuit (e.g., a communication module 190); at least one processor (e.g., the processor 120) operatively connected to the speaker 155, the touchscreen display 160, and the communication circuit 190; and a memory (e.g., the memory 130) operatively connected to the processor 120, wherein the memory 130 stores instructions configured to, when executed, cause the at least one processor 120 to: execute a calling application; attempt to connect a call to a service provider using the communication circuit 190; during the call connection to the service provider, receive a first user input to request a standby mode for connection to an attendant of the service provider, the calling application being executed in the background in the standby mode; in response to the first user input, execute the calling application in the standby mode; while the calling application is being executed in the standby mode, determine whether the attendant is connected, on the basis of a voice transmitted by the service provider; in response to completion of connection to the attendant, output a notification indicating that connection to the attendant has been completed, using the speaker 155 or the touchscreen display 160; and in response to reception of a second user input for the output notification, terminate the standby mode. According to an embodiment, the processor 120 may display, via the touchscreen display 160, an icon indicating a function to provide the standby mode and may convert the mode of the calling application to the standby mode in response to an input of selecting the icon. According to an embodiment, as at least a part of determining whether an attendant is connected, on the basis of at least one voice transmitted by the service provider, the processor 120 may use a first voice of the at least one received voice and a determination model obtained by learning an attendant voice, so as to perform a comparison to determine whether the first voice is similar to the determination model by a threshold value or greater. According to an embodiment, as at least a part of determining whether an attendant is connected, on the basis of at least one voice transmitted by the service provider, the processor 120 may extract at least one audio characteristic from the first voice, and may compare, using a determination model obtained by learning the audio characteristics extracted from the attendant voice, to determine whether the first voice is similar to the determination model by the threshold value or greater. According to an embodiment, as at least a part of determining whether an attendant is connected, on the basis of at least one voice transmitted by the service provider, the processor 120 may convert a first voice of the at least one voice into text, and may determine a correlation between the converted text and a determination model obtained using a learning corpus for designated greetings, and when the correlation has a value equal to the threshold value or greater, it may be determined that the first voice corresponds to the attendant voice. According to an embodiment, while the calling application is being executed in the standby mode, the processor 120 may not display an execution screen of the calling application on the touchscreen display, and may restrict a function of the speaker or the microphone.

An electronic device (e.g., the electronic device 101 in FIG. 1) according to various embodiments may include: a communication circuit (e.g., a communication module 190); at least one processor (e.g., the processor 120) operatively connected to the communication circuit 190; and a memory (e.g., the memory 130) operatively connected to the processor 120, wherein the memory 130 stores instructions configured to, when executed, cause the at least one processor 120 to: receive a request for a call connection to a service provider from an external electronic device, the request including user information of the external electronic device and at least one piece of keyword information related to a detailed service and the service provider; in response to the request, acquire an identification number for the call connection to the service provider; select a first menu corresponding to the detailed service included in the request from menu information including one or more detailed services provided by the service provider; attempt to connect a call between the external electronic device and the service provider; when the call to the service provider is connected, transmit one or more responses until reaching a step corresponding to the first menu, in response to one or more voice prompts provided by the service provider; in response to reaching the first menu, determine whether an attendant is connected on the basis of at least one voice transmitted by the service provider; in response to completion of connection to the attendant, provide the external electronic device with information indicating that connection to the attendant of the service provider has been established, using the communication circuit 190; and in response to reception of a message indicating that the call between the external electronic device and the service provider has been connected, terminate the call connection with the service provider.

Hereinafter, an integrated intelligence system to which an embodiment can be applied will be described.

Figure 17:
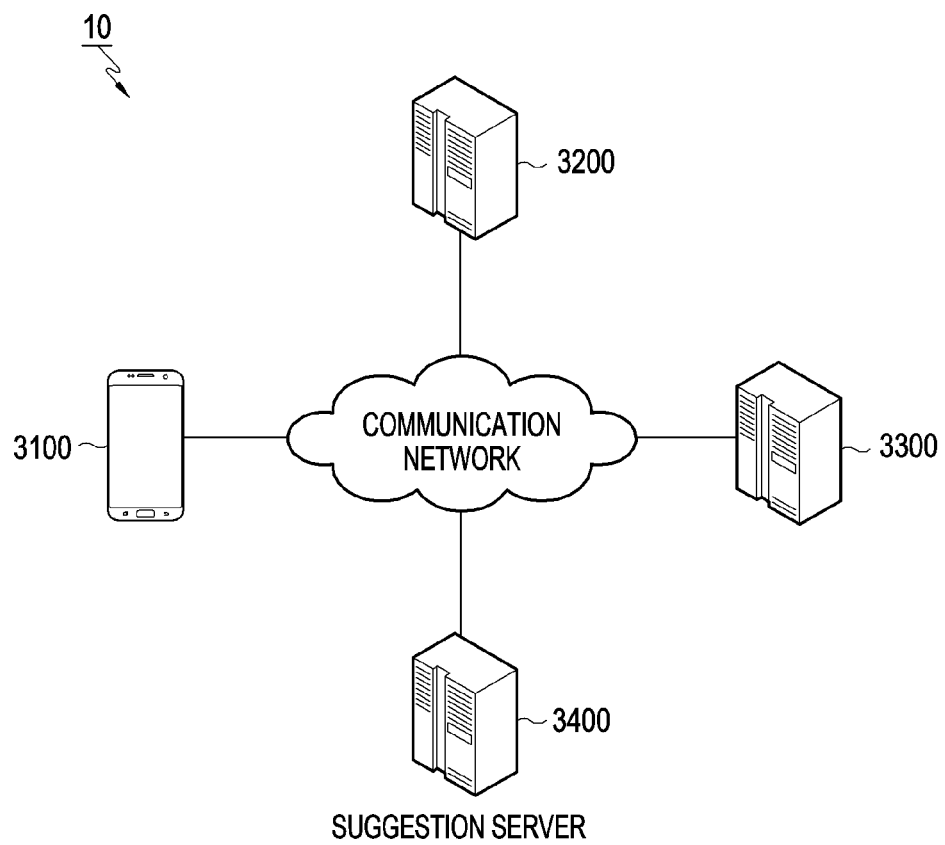
FIG. 17 is a diagram illustrating an integrated intelligence system according to various embodiments.

FIG. 17 is a diagram illustrating an integrated intelligence system according to various embodiments.

Referring to FIG. 17, an integrated intelligence system 10 may include a user terminal 3100, an intelligent server 3200, a personalization information server 3300, or a suggestion server 3400.

The user terminal 3100 (e.g., the electronic device 101) may provide a service necessary for a user via an app (or an application program (e.g., an alarm app, a message app, a picture (gallery) app, etc.)) stored within the user terminal 3100. For example, the user terminal 3100 may execute and operate another application via an intelligent app (or a voice recognition app) stored within the user terminal 3100. The user terminal 3100 may receive user input for executing and operating the another app via the intelligent app of the user terminal 3100. The user input may be received via, for example, a physical button, a touch pad, a voice input, a remote input, and the like. According to an embodiment, the user terminal 3100 may be any of various terminal devices (or electronic device) connectable to the Internet, such as a mobile phone, a smartphone, a Personal Digital Assistant (PDA), or a notebook computer.

According to an embodiment, the user terminal 3100 may receive a user utterance as a user input. The user terminal 3100 may receive a user utterance and may generate a command that operates an app on the basis of the user utterance. Accordingly, the user terminal 3100 may operate the app using the command.

The intelligent server 3200 may receive a user voice input from the user terminal 3100 via a communication network and may change the received user voice input to text data. In another embodiment, the intelligent server 3200 may generate (or select) a path rule on the basis of the text data. The path rule may include information of actions (or operations) for performing a function of an app or information of a parameter necessary to execute the action. The path rule may include a sequence of the operations of the app. The user terminal 3100 may receive the path rule, may select an app according to the path rule, and may execute operations included in the path rule by the selected app.

For example, the user terminal 3100 may execute the operations and may display, on the display, a screen corresponding to the state of the user terminal 3100 having executed the operations. As another example, the user terminal 3100 may execute the operations but may not display results of performing the operations on the display. The user terminal 3100 may, for example, execute multiple operations and may display only some results of the multiple operations on the display. The user terminal 3100 may display, on the display, only a result obtained by executing the last operation in the sequence. As still another example, the user terminal 3100 may receive a user input and may display, on the display, the result obtained by executing the operations.

The personalization information server 3300 may include a database storing user information. For example, the personalization information server 3300 may receive user information (e.g., context information, app execution, etc.) from the user terminal 3100, and may store the received user information in the database. The intelligent server 3200 may receive the user information from the personalization information server 3300 via the communication network, and may use the received user information in the case of generating a path rule for the user input. According to an embodiment, the user terminal 3100 may receive user information from the personalization information server 3300 via the communication network, and may use the received user information as information for managing the database.

The suggestion server 3400 may include a database within the terminal, which stores an introduction of an application or a function, or information of a function to be provided. For example, the suggestion server 3400 may receive user information of the user terminal 3100 from the personalization information server 3300 and may include a database for a function available to a user. The user terminal 3100 may receive information on a function to be provided from the suggestion server 3400 via a communication network and may provide the received information to the user.

Figure 18:
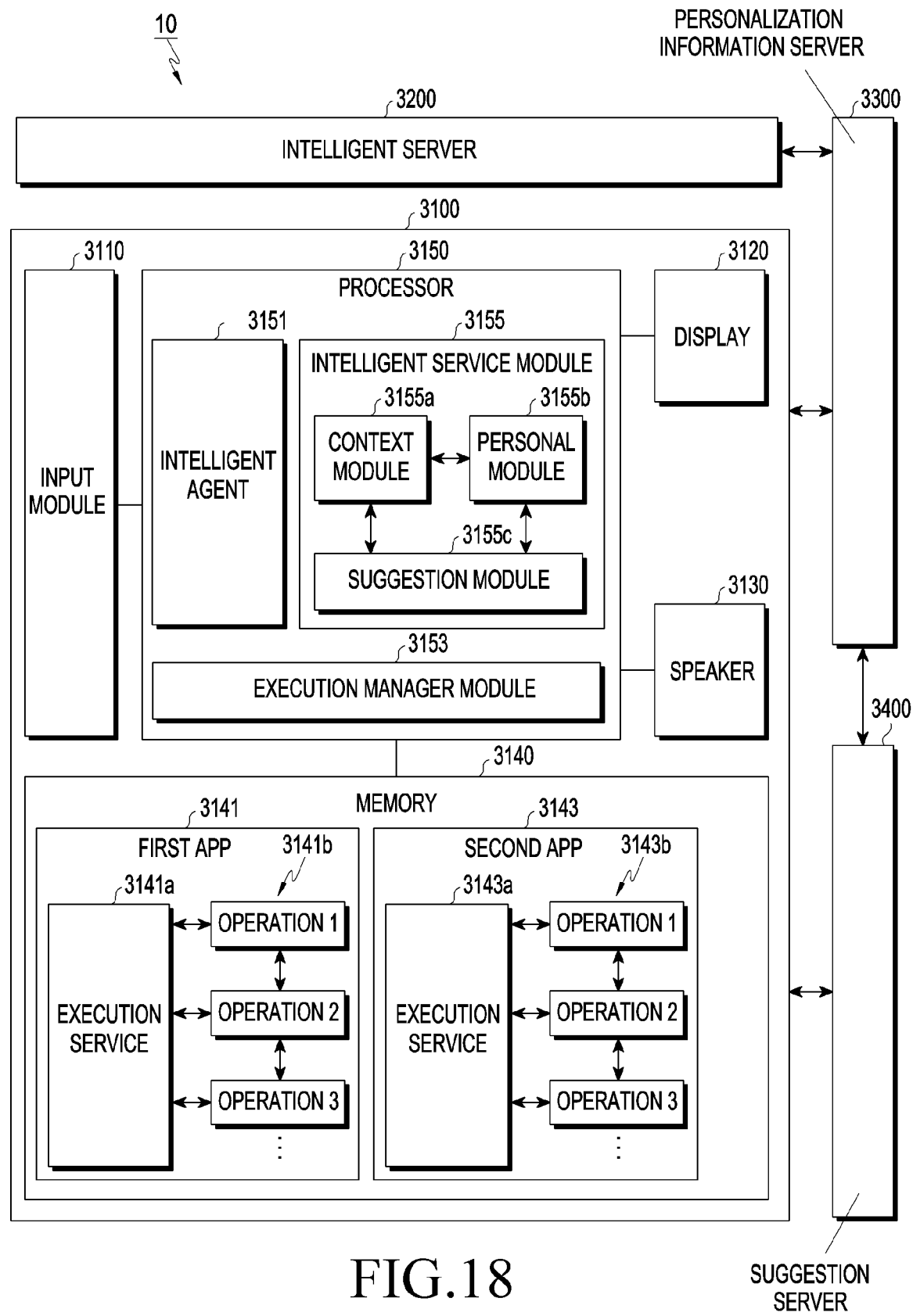
FIG. 18 is a block diagram illustrating a user terminal of the integrated intelligence system according to an embodiment.

FIG. 18 is a block diagram illustrating a user terminal of the integrated intelligence system according to an embodiment.

Referring to FIG. 18, the user terminal 3100 may include an input module 3110, a display 3120, a speaker 3130, a memory 3140, or a processor 3150. The user terminal 3100 may further include a housing, and elements of the user terminal 3100 may be seated inside the housing or located on the housing.

According to an embodiment, the input module 3110 may receive a user input from a user. For example, the input module 3110 may receive a user input from a connected external electronic device (e.g., a keyboard and a headset). As another example, the input module 3110 may include a touchscreen (e.g., a touchscreen display) coupled with the display 3120. As still another example, the input module 3110 may include a hardware key (e.g., 3112 of FIG. 19) (or a physical key) located in the user terminal 3100 (or the housing of the user terminal 3100).

According to an embodiment, the input module 3110 may include a microphone (e.g., 3111 in FIG. 18) capable of receiving a user utterance as a voice signal. For example, the input module 3110 may include an utterance input system (a speech input system), and may receive a user utterance as a voice signal via the speech input system.

According to an embodiment, the display 3120 may display an image, a video, and/or an execution screen of an application. For example, the display 3120 may display a Graphical User Interface (GUI) of an app.

According to an embodiment, the speaker 3130 may output a voice signal. For example, the speaker 3130 may output a voice signal generated inside the user terminal 3100 to the outside.

According to an embodiment, the memory 3140 may store multiple apps 3141 and 3143. The multiple apps 3141 and 3143 stored in the memory 3140 may be selected and executed and may operate according to user input.

According to an embodiment, the memory 3140 may include a database capable of storing information necessary to recognize user input. For example, the memory 3140 may include a log database capable of storing log information. As another example, the memory 3140 may include a persona database capable of storing user information.

According to an embodiment, the memory 3140 may store multiple apps 3141 and 3143, and the multiple apps 3141 and 3143 may be loaded and operated. For example, the multiple apps 3141 and 3143 stored in the memory 3140 may be loaded and operated by an execution manager module 3153 of the processor 3150. The multiple apps 3141 and 3143 may include multiple operations (or unit operations) 3141b and 3143b or execution services 3141a and 3143a that perform functions. The execution services 3141a and 3143a may be generated by an execution manager module 3153 of the processor 3150 and may execute the multiple operations 3141b and 3143b.

According to an embodiment, when the operations 3141b and 3143b of the apps 3141 and 3143 are executed, an execution state screen according to execution of the operations 3141b and 3143b may be displayed on the display 3120. The execution state screen may be a screen indicating the state in which the operations 3141b and 3143b have been completed. The execution state screen may be a screen of a partial landing state (e.g., in the case where a parameter necessary for the operations 3141b and 3143b is not input) in which execution of the operations 3141b and 3143b has stopped.

According to an embodiment, the execution services 3141a and 3143a may execute the operations 3141b and 3143b according to the path rule. For example, the execution services 3141a and 3143a may be activated by the execution manager module 3153, may receive an execution request according to the path rule from the execution manager module 3153, and may execute the operations 3141b and 3143b of the apps 3141 and 3143. When execution of the operations 3141b and 3143b is completed, the execution services 3141a and 3143a may transmit completion information to the execution manager module 3153.

According to an embodiment, when the multiple operations 3141b and 3143b are executed in the apps 3141 and 3143, the multiple operations 3141b and 3143b may be sequentially executed. When execution of one operation (operation 1) is completed, the execution services 3141a and 3143a may open a subsequent operation (operation 2) and may transmit completion information to the execution manager module 3153. Here, opening of an arbitrary operation may be understood as shifting the arbitrary operation to an executable state or preparing for execution of the arbitrary operation. In other words, if an arbitrary operation is not opened, the operation may not be executed. The execution manager module 3153 may transmit, when the completion information is received, an execution request for subsequent operations 3141b and 3143b to the execution service (e.g., operation 2). According to an embodiment, when the multiple apps 3141 and 3143 are executed, the multiple apps 3141 and 3143 may be sequentially executed. For example, when execution of a last operation of a first app 3141 is completed and completion information is received, the execution manager module 3153 may transmit an execution request of a first operation of a second app 3143 to the execution service 3143a.

According to an embodiment, when the multiple operations 3141b and 3143b are executed in the apps 3141 and 3143, execution state screens according to execution of the respective operations 3141b and 3143b may be displayed on the display 3120. According to an embodiment, only some of multiple result screens according to execution of the multiple executed operations 3141b and 3143b may be displayed on the display 3120.

According to an embodiment, the memory 3140 may store an intelligent app (e.g., a voice recognition app) linked to an intelligent agent 3151. The app linked to the intelligent agent 3151 may receive and process a user utterance as a voice signal. According to an embodiment, the app linked to the intelligent agent 3151 may be operated by a specific input (e.g., an input via a hardware key, an input via a touchscreen, and a specific voice input) that is input via an input module 3110.

According to an embodiment, the processor 3150 may control the overall operation of the user terminal 3100. According to an embodiment, the processor 3150 may control the input module 3110 to receive user input. The processor 3150 may control the display 3120 to display an image. The processor 3150 may control the speaker 3130 to output a voice signal. The processor 3150 may control the memory 3140 to retrieve or store necessary information.

According to an embodiment, the processor 3150 may include the intelligent agent 3151, the execution manager module 3153, or an intelligent service module 3155. According to an embodiment, the processor 3150 may execute stored instructions to operate the intelligent agent 3151, the execution manager module 3153, or the intelligent service module 3155. Various modules referred to in various embodiments may be implemented in hardware or in software. In various embodiments, the operations performed by the intelligent agent 3151, the execution manager module 3153, or the intelligent service module 3155 may be understood as operations performed by the processor 3150.

According to an embodiment, the intelligent agent 3151 may generate an instruction to operate an app on the basis of a voice signal received via a user input. According to an embodiment, the execution manager module 3153 may receive the generated command from the intelligent agent 3151, and may select, execute, and operate the apps 3141 and 3143 stored in the memory 3140. According to an embodiment, the intelligent service module 3155 may be used to manage user information and process user input.

The intelligent agent 3151 may transmit the user input received through the input module 3110 to the intelligent server 3200 so as to process the user input.

According to an embodiment, the intelligent agent 3151 may pre-process the user input before transmitting the user input to the intelligent server 3200. According to an embodiment, the intelligent agent 3151 may include an Adaptive Echo Canceller (AEC) module, a Noise Suppression (NS) module, an End-Point Detection (EPD) module or an Automatic Gain Control (AGC) module in order to pre-process the user input. The adaptive echo cancellation unit may remove an echo included in the user input. The noise suppression module may suppress background noise included in the user input. The end-point detection module may detect an end point of a user voice included in the user input to find a part where the user voice exists. The automatic gain control module may recognize the user input and may adjust the volume of the user input so as to be suitable for processing. According to an embodiment, the intelligent agent 3151 may include all of pre-processing configurations for performance, but in another embodiment, the intelligent agent 3151 may include some of the pre-processing configurations to allow operation at low power.

According to an embodiment, the intelligent agent 3151 may include a wake-up recognition module that recognizes a user's call. The wake-up recognition module may recognize a wake-up command of a user via the voice recognition module, and may activate the intelligent agent 3151 to receive user input when the wake-up command is received. According to an embodiment, the wake-up recognition module of the intelligent agent 3151 may be implemented in a low-power processor (e.g., a processor included in an audio codec). According to an embodiment, the intelligent agent 3151 may be activated in response to user input via a hardware key. When the intelligent agent 3151 is activated, an intelligent app (e.g., a voice recognition app) linked to the intelligent agent 3151 may be executed.

According to an embodiment, the intelligent agent 3151 may include a voice recognition module that performs user input. The voice recognition module may recognize user input for causing an app to perform an operation. For example, the voice recognition module may recognize a limited user (voice) input (e.g., a sound, such as "click" to cause a photographing operation while a camera app is running) which executes an operation, such as the wake-up command in the apps 3141 and 3143. The voice recognition module that assists the intelligent server 3200 and recognizes user input may, for example, recognize and quickly process a user command that may be processed in the user terminal 3100. According to an embodiment, the voice recognition module that executes a user input of the intelligent agent 3151 may be implemented in an app processor.

According to an embodiment, the voice recognition module (including the voice recognition module of the wake-up module) of the intelligent agent 3151 may recognize user input using an algorithm for voice recognition. The algorithm used to recognize a voice may be, for example, at least one of a Hidden Markov Model (HMM) algorithm, an Artificial Neural Network (ANN) algorithm, or a Dynamic Time Warping (DTW) algorithm.

According to an embodiment, the intelligent agent 3151 may convert a voice input of a user into text data. According to an embodiment, the intelligent agent 3151 may transfer a voice of a user to the intelligent server 3200 so as to receive converted text data. Accordingly, the intelligent agent 3151 may display the text data on the display 3120.

According to an embodiment, the intelligent agent 3151 may receive a path rule transmitted from the intelligent server 3200. According to an embodiment, the intelligent agent 3151 may transmit the path rule to the execution manager module 3153.

According to an embodiment, the intelligent agent 3151 may transmit, to the intelligent service module 3155, an execution result log according to the path rule received from the intelligent server 3200, and the transmitted execution result log may be accumulated and managed in user preference information of a persona module (persona manager) 3155b.

According to an embodiment, the execution manager module 3153 may receive the path rule from the intelligent agent 3151 to execute the apps 3141 and 3143, and may allow the apps 3141 and 3143 to execute the operations 3141b and 3143b. For example, the execution manager module 3153 may transmit, to the apps 3141 and 3143, command information for execution of the operations 3141b and 3143b, and may receive completion information of the operations 3141b and 3143b from the apps 3141 and 3143.

According to an embodiment, the execution manager module 3153 may transmit or receive the command information for execution of the operations 3141b and 3143b of the apps 3141 and 3143 between the intelligent agent 3151 and the apps 3141 and 3143. The execution manager module 3153 may bind the apps 3141 and 3143 to be executed according to the path rule, and may transmit the command information of the operations 3141b and 3143b, which is included in the path rule, to the apps 3141 and 3143. For example, the execution manager module 3153 may sequentially transmit the operations 3141b and 3143b included in the path rule to the apps 3141 and 3143 so as to sequentially execute the operations 3141b and 3143b of the apps 3141 and 3143.

According to an embodiment, the execution manager module 3153 may manage execution states of the operations 3141b and 3143b of the apps 3141 and 3143. For example, the execution manager module 3153 may receive information on the execution states of the operations 3141b and 3143b from the apps 3141 and 3143. When the execution states of the operations 3141b and 3143b correspond to, for example, a partial landing state (in the case where parameters necessary for the operations 3141b and 3143b are not input), the execution manager module 3153 may transmit information of the partial landing state to the intelligent agent 3151. The intelligent agent 3151 may use the received information to request a user to input necessary information (e.g., parameter information). When the execution states of the operations 3141b and 3143b correspond to, as another example, an operation state, an utterance may be received from a user, and the execution manager module 3153 may transmit information of the apps 3141 and 3143 being executed and information of the execution states of the apps 3141 and 3143 to the intelligent agent 3151. The intelligent agent 3151 may receive parameter information of the user's utterance through the intelligent server 3200, and may transmit the received parameter information to the execution manager module 3153. The execution manager module 3153 may change the parameters of the operations 3141b and 3143b to new parameters by using the received parameter information.

According to an embodiment, the execution manager module 3153 may transfer the parameter information included in the path rule to the apps 3141 and 3143. When the multiple apps 3141 and 3143 are sequentially executed according to the path rule, the execution manager module 3153 may transmit the parameter information included in the path rule from one app to another app.

According to an embodiment, the execution manager module 3153 may receive multiple path rules. The execution manager module 3153 may select multiple path rules on the basis of the utterance of the user. For example, when the user utterance specifies one app 3141 to execute a partial operation 3141b but does not specify another app 3143 to execute a remaining operation 3143b, the execution manager module 3153 may receive different multiple path rules in which an identical app 3141 (e.g., a gallery app) to execute the partial operation 3141b is executed and different apps 3143 (e.g., a message app and a Telegram app) capable of executing the remaining operation 3143b are separately executed. The execution manager module 3153 may execute, for example, identical operations 3141b and 3143b (e.g., identical successive operations 3141b and 3143b) of the multiple path rules. When the identical operations are executed, the execution manager module 3153 may display, on the display 3120, a state screen that enables selection of different apps 3141 and 3143 included in respective multiple path rules.

According to an embodiment, the intelligent service module 3155 may include a context module 3155a, a persona module 3155b, or a suggestion module 3155c.

The context module 3155a may collect, from apps 3141 and 3143, current states of the apps 3141 and 3143. For example, the context module 3155a may receive context information indicating the current states of the apps 3141 and 3143 so as to collect the current states of the apps 3141 and 3143.

The persona module 3155b may manage personal information of a user using the user terminal 3100. For example, the persona module 3155b may collect performance results and use information of the user terminal 3100 so as to manage the personal information of the user.

The suggestion module 3155c may predict a user intent and may recommend a command to the user. For example, the suggestion module 3155c may recommend a command to a user in consideration of the current state of the user (e.g., time, place, situation, and app).

Figure 19:
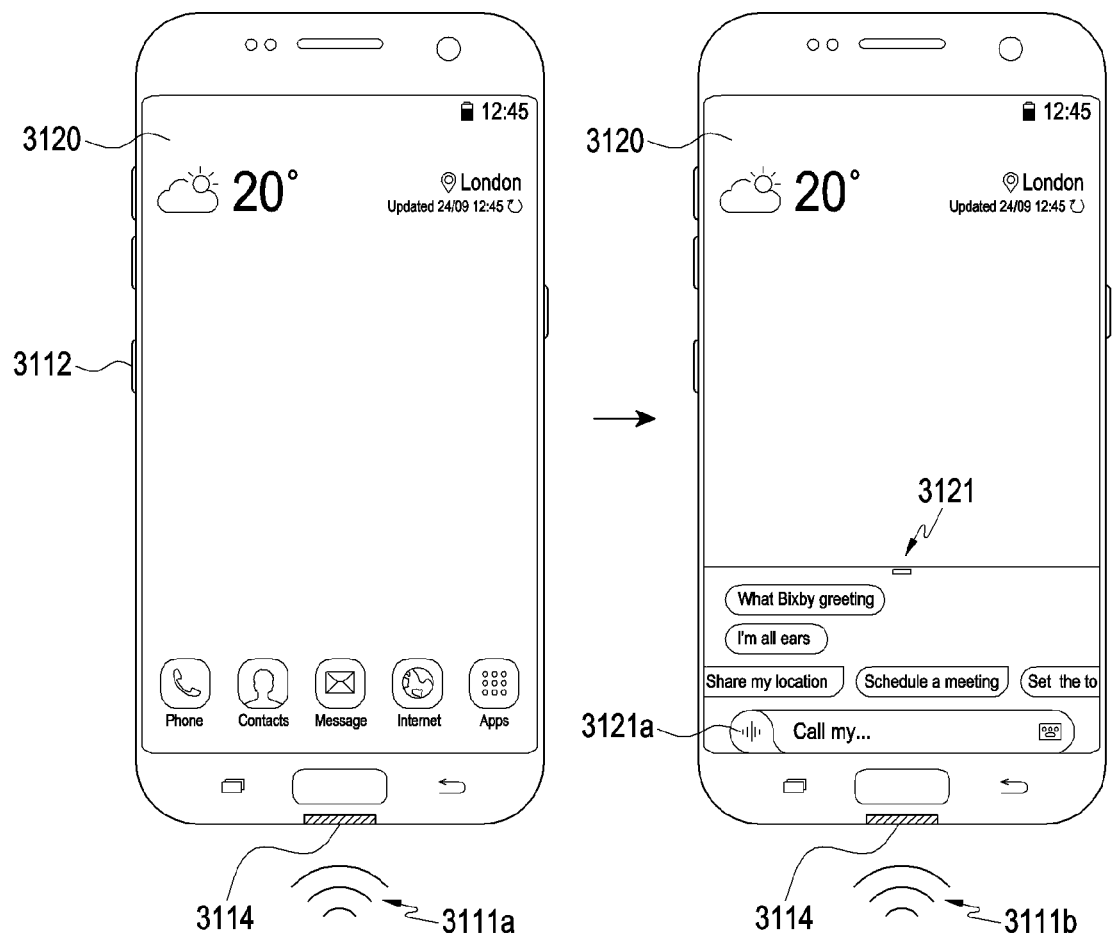
FIG. 19 is a diagram illustrating execution of an intelligent app by the user terminal according to an embodiment.

FIG. 19 is a diagram illustrating execution of an intelligent app by the user terminal according to an embodiment.

Referring to FIG. 19, the user terminal 3100 receives a user input and executes an intelligent app (e.g., a voice recognition app) linked to the intelligent agent 3151.

According to an embodiment, the user terminal 3100 may execute the intelligent app for voice recognition via a hardware key 3112. For example, the user terminal 3100 may display, on the display 3120, a User Interface (UI) 3121 of the intelligent app when the user input is received via the hardware key 3112. A user may, for example, press a voice recognition button 3121a in the UI 3121 of the intelligent app to input 3111b a voice in a state where the UI 3121 of the intelligent app is displayed on the display 3120. The user may, as another example, hold down the hardware key 3112 to input 3111b a voice.

According to an embodiment, the user terminal 3100 may execute the intelligent app for voice recognition via a microphone 3114. For example, the user terminal 3100 may display the UI 3121 of the intelligent app on the display 3120 when a voice (e.g., "Wake up!") is input 3111a via the microphone 3114.

Figure 20:
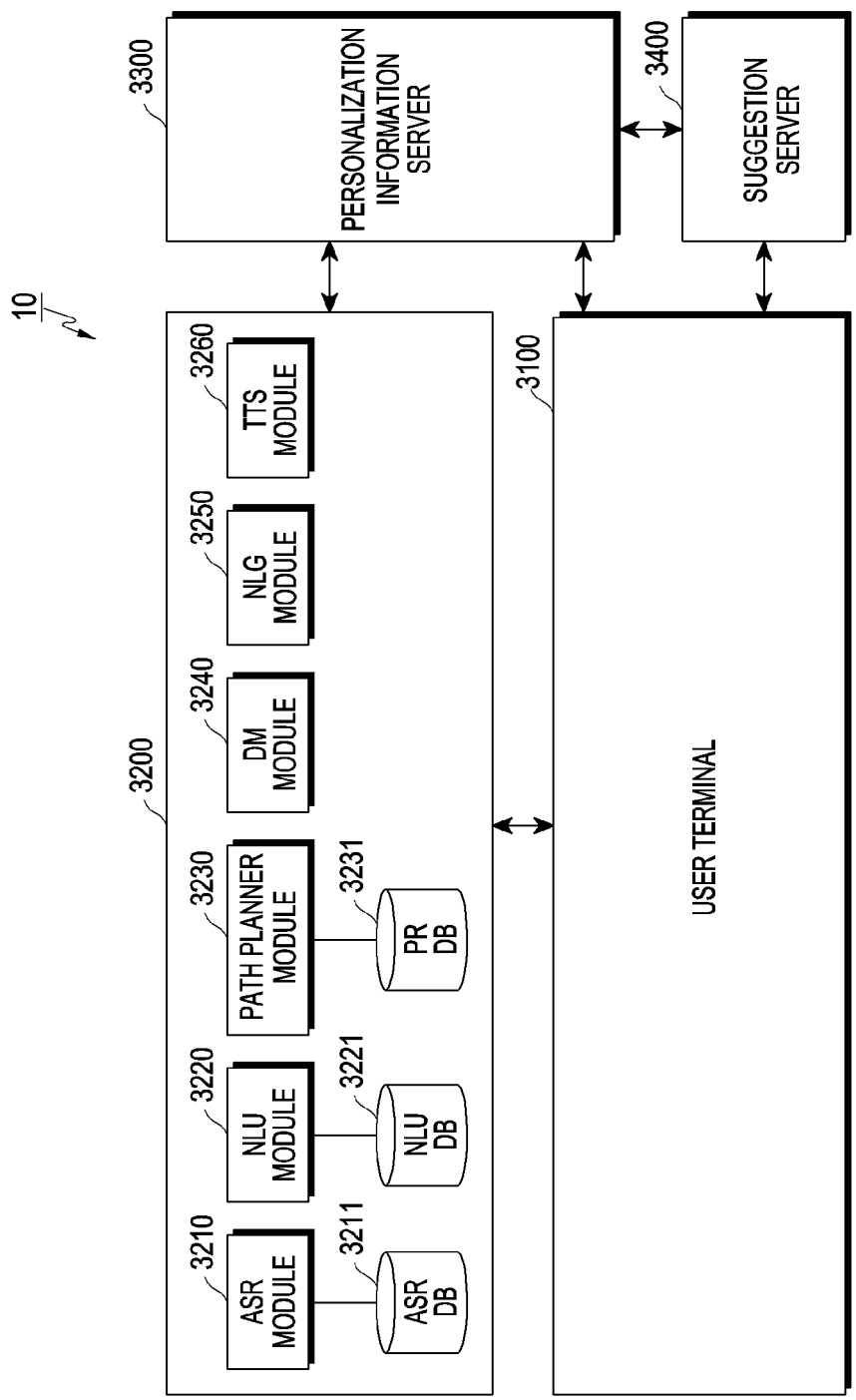
FIG. 20 is a block diagram illustrating a server of the integrated intelligence system according to an embodiment.

FIG. 20 is a block diagram illustrating a server of the integrated intelligence system according to an embodiment.

Referring to FIG. 20, the intelligent server 3200 may include an Automatic Speech Recognition (ASR) module 3210, a Natural Language Understanding (NLU) module 3220, a path planner module 3230, a Dialogue Manager (DM) module 3240, a Natural Language Generator (NLG) module 3250, or a Text-To-Speech (TTS) module 3260.

The natural language understanding module 3220 or the path planner module 3230 of the intelligent server 3200 may generate a path rule.

According to an embodiment, the automatic speech recognition (ASR) module 3210 may convert a user input received from the user terminal 3100 into text data.

According to an embodiment, the automatic speech recognition module 3210 may convert the user input received from the user terminal 3100 into text data. For example, the automatic speech recognition module 3210 may include an utterance recognition module. The speech recognition module may include an acoustic model and a language model. For example, the acoustic model may include information related to vocalization, and the language model may include unit phoneme information and information on combinations of unit phoneme information. The speech recognition module may convert a user utterance into text data using information on vocalization and unit phonemic information. The information on the acoustic model and the language model may be stored in, for example, an automatic speech recognition database (ASR DB) 3211.

According to an embodiment, the natural language understanding module 3220 may perform a syntactic analysis or a semantic analysis to identify a user intent. The syntactic analysis may divide the user input into syntactic units (e.g., words, phrases, morphemes, etc.) and may determine what syntactic elements the divided units have. The semantic analysis may be performed using semantic matching, rule matching, formula matching, or the like. Accordingly, the natural language understanding module 3220 may obtain a domain, an intent, or a parameter (or slot) necessary for the user input in order to express the intent.

According to an embodiment, the natural language understanding module 3220 may determine user intent and parameters using matching rules that are divided into a domain, an intent, and a parameter (or a slot) necessary to identify the intent. For example, one domain (e.g., alarm) may include multiple intents (e.g., alarm setting, alarm cancellation, etc.), and one intent may include multiple parameters (e.g., time, number of repetitions, alarm sound, etc.). The multiple rules may include, for example, one or more mandatory element parameters. The matching rules may be stored in a natural language understanding database (NLU DB) 3221.

According to one embodiment, the natural language understanding module 3220 may identify the meaning of a word extracted from a user input using linguistic features (e.g., grammatical elements), such as morphemes, phrases, etc., and user intent may be determined by matching the identified meaning of the word with a domain and an intent. For example, the natural language understanding module 3220 may determine the user intent by obtaining how many words extracted from the user input are included in each domain and intent. According to an embodiment, the natural language understanding module 3220 may determine a parameter of the user input using a word that is the basis for understanding the intent. According to an embodiment, the natural language understanding module 3220 may determine the user intent using the natural language recognition database 3221 in which a linguistic characteristic for identifying the intent of the user input is stored. According to another embodiment, the natural language understanding module 3220 may determine user intent using a Personalized Language Model (PLM). For example, the natural language understanding module 3220 may determine the user input using personalized information (e.g., a contact list and a music list). The personalized language model may be stored, for example, in the natural language recognition database 3221. According to an embodiment, not only the natural language understanding module 3220 but also the automatic speech recognition module 3210 may recognize a user's voice by referring to the personalized language model stored in the natural language recognition database 3221.

According to an embodiment, the natural language understanding module 3220 may generate a path rule on the basis of a parameter and intent of the user input. For example, the natural language understanding module 3220 may select an app to be executed on the basis of the intent of a user input, and may determine an operation to be performed in the selected app. The natural language understanding module 3220 may generate a path rule by determining a parameter corresponding to the determined operation. According to an embodiment, the path rule generated by the natural language understanding module 3220 may include an app to be executed, an operation to be executed by the app, and information of a parameter necessary for executing the operation.

According to an embodiment, the natural language understanding module 3220 may generate one path rule or multiple path rules on the basis of user intent and a parameter. For example, the natural language understanding module 3220 may receive a path rule set corresponding to the user terminal 3100 from the path planner module 3230 and may map the parameter and the intent of the user input to the received path rule set in order to determine a path rule.

According to another embodiment, the natural language understanding module 3220 may determine an app to be executed, an operation to be performed in the app, and a parameter necessary to perform the operation on the basis of a parameter and intent of the user input so as to generate one path rule or multiple path rules. For example, the natural language understanding module 3220 may use information of the user terminal 3100 to arrange the app to be executed and the operation to be executed in the app in the form of an ontology or a graph model according to the intent of the user input so as to generate a path rule. The generated path rule may be stored in a path rule database (PR DB) 3231 via, for example, the path planner module 3230. The generated path rule may be added to a path rule set of a database 3231.

According to an embodiment, the natural language understanding module 3220 may select at least one path rule among the multiple generated path rules. According to an embodiment, the natural language understanding module 3220 may select an optimum path rule of the multiple path rules. As another example, the natural language understanding module 3220 may select multiple path rules when only some operations are specified based on a user utterance. The natural language understanding module 3220 may determine one path rule among the multiple path rules based on additional input by a user.

According to an embodiment, the natural language understanding module 3220 may transmit a path rule to the user terminal 3100 in response to a user input. For example, the natural language understanding module 3220 may transmit one path rule corresponding to the user input to the user terminal 3100. As another example, the natural language understanding module 3220 may transmit multiple path rules corresponding to the user input to the user terminal 3100. The multiple path rules may be generated by the natural language understanding module 3220, for example, when only some operations are specified based on a user utterance.

According to an embodiment, the path planner module 3230 may select at least one path rule among multiple path rules.

According to an embodiment, the path planner module 3230 may transfer a path rule set including multiple path rules to the natural language understanding module 3220. The multiple path rules of the path rule set may be stored in the form of a table in the path rule database 3231 connected to the path planner module 3230. For example, the path planner module 3230 may transfer a path rule set corresponding to information (e.g., OS information and app information) of the user terminal 3100, which is received from the intelligent agent 3151, to the natural language understanding module 3220. A table stored in the path rule database 3231 may be stored, for example, for each domain or domain version. Path rule planning may also be referred to as action sequence planning depending on the implementation.

According to an embodiment, the path planner module 3230 may select one path rule or multiple path rules from a path rule set and may transfer the selected path rule or path rules to the natural language understanding module 3220. For example, the path planner module 3230 may select one path rule or multiple path rules by matching a parameter and user intent with the path rule set corresponding to the user terminal 3100, and may transfer the selected rule path or rule paths to the natural language understanding module 3220.

According to an embodiment, the path planner module 3230 may generate one path rule or multiple path rules on the basis of user intent and a parameter. For example, the path planner module 3230 may generate one path rule or multiple path rules by determining an app to be executed and an operation to be executed in the app on the basis of the user intent and the parameter. According to an embodiment, the path planner module 3230 may store the generated path rule in the path rule database 3231.

According to an embodiment, the path planner module 3230 may store a path rule generated in the natural language understanding module 3220 in the path rule database 3231. The generated path rule may be added to the path rule set stored in the path rule database 3231.

According to an embodiment, the table stored in the path rule database 3231 may include multiple path rules or multiple path rule sets. The multiple path rules or multiple path rule sets may reflect the kind, version, type, or characteristic of the device that executes each path rule.

According to an embodiment, the dialogue manager module 3240 may determine whether user intent identified by the natural language understanding module 3220 is clear. For example, the dialogue manager module 3240 may determine whether the user intent is clear on the basis of whether parameter information is sufficient. The dialogue manager module 3240 may determine whether a parameter identified in the natural language understanding module 3220 is sufficient to perform a task. According to an embodiment, the dialogue manager module 3240 may perform feedback for requesting information necessary for a user when the user intent is not clear. According to an embodiment, the dialogue manager module 3240 may perform feedback for requesting parameter information for identification of the user intent.

According to an embodiment, the dialogue manager module 3240 may include a content provider module. When the content provider module is capable of performing an operation on the basis of a parameter and an intent identified by the natural language understanding module 3220, the content provider module may generate a result of performing a task corresponding to a user input. According to an embodiment, the dialogue manager module 3240 may transmit the result generated by the content provider module to the user terminal 3100 in response to the user input.

According to an embodiment, the natural language generation module (NLG) 3250 may change specified information into a text form. The information changed into the text form may be in the form of a natural language utterance. The specified information may be, for example, information of an additional input, information indicating completion of an operation corresponding to a user input, or information (e.g., feedback information for a user input) prompting for additional input by a user. The information changed into the text form may be transmitted to the user terminal 3100 and displayed on the display 3120, or may be transmitted to the text-to-speech module 3260 and changed into a voice form.

According to an embodiment, the text-to-speech module 3260 may change information in the text form to information in the voice form. The text-to-speech module 3260 may receive text-form information from the natural language generation module 3250, and may change the text-form information into voice-form information so as to transmit the voice-form information to the user terminal 3100. The user terminal 3100 may output the voice-form information to the speaker 3130.

According to an embodiment, the natural language understanding module 3220, the path planner module 3230, and the dialogue manager module 3240 may be implemented as a single module. For example, the natural language understanding module 3220, the path planner module 3230, and the dialogue manager module 3240 may be implemented as a single module to determine a parameter and user intent, and may generate a response (e.g., a path rule) corresponding to the determined parameter and user intent. Accordingly, the generated response may be transmitted to the user terminal 3100.

Figure 21:
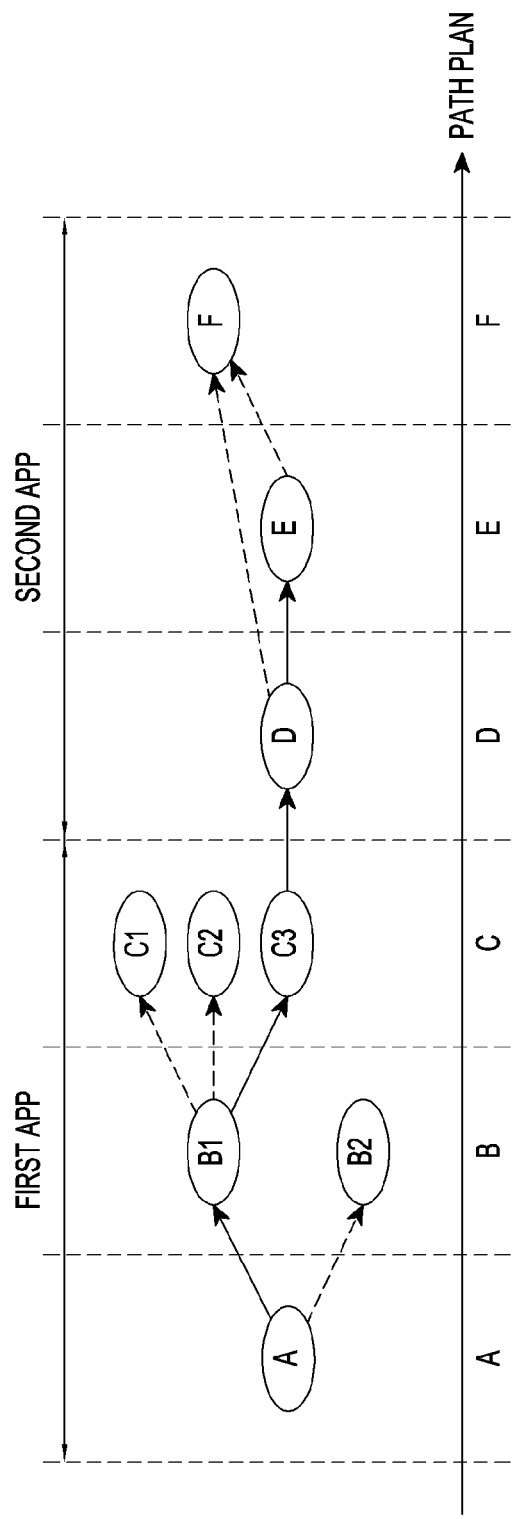
FIG. 21 is a diagram illustrating a method of generating a path rule by a path Natural Language Understanding (NLU) module according to an embodiment.

FIG. 21 is a diagram illustrating a method of generating a path rule by a path planner module according to an embodiment.

Referring to FIG. 21, according to an embodiment, the natural language understanding module 3220 may divide the functions of an app into unit operations A to F and store the same in the path rule database 3231. For example, the natural language understanding module 3220 may store, in the path rule database 3231, a path rule set including the multiple path rules divided into unit operations A-B1-C1, A-B1-C2, A-B1-C3-D-F, and A-B1-C3-D-E-F.

According to an embodiment, the path rule database 3231 of the path planner module 3230 may store a path rule set for execution of a function of an app. The path rule set may include multiple path rules including multiple operations. In the multiple path rules, operations executed according to parameters that are input to respective multiple operations may be sequentially arranged. According to an embodiment, the multiple path rules may be configured in an ontology or graph model form and stored in the path rule database 3231.

According to an embodiment, the natural language understanding module 3220 may select an optimum path rule A-B1-C3-D-F from among the multiple path rules A-B1-C1, A-B1-C2, A-B1-C3-D-F, and A-B1-C3-D-E-F corresponding to a parameter and an intent of user input.

According to an embodiment, the natural language understanding module 3220 may transfer multiple rules to the user terminal 3100 when there is no path rule that perfectly matches the user input. For example, the natural language understanding module 3220 may select a path rule (e.g., A-B1) partially corresponding to the user input. The natural language understanding module 3220 may select one or more path rules (e.g., A-B1-C1, A-B1-C2, A-B1-C3-D-F, and A-B1-C3-D-E-F) including the path rule (e.g., A-B1)

partially corresponding to the user input so as to transfer the selected path rules to the user terminal 3100.

According to an embodiment, the natural language understanding module 3220 may select one of multiple path rules on the basis of an additional input of the user terminal 3100 and may transfer the selected one path rule to the user terminal 3100. For example, the natural language understanding module 3220 may select one path rule (e.g., A-B1-C3-D-F) from among multiple path rules (e.g., A-B1-C1, A-B1-C2, A-B1-C3-D-F, and A-B1-C3-D-E-F) according to additional user input (e.g., an input to select C3) performed via the user terminal 3100 and may transmit the selected one path rule to the user terminal 3100.

According to another embodiment, the natural language understanding module 3220 may determine a parameter or user intent corresponding to the user input (e.g., an input to select C3) additionally input to the user terminal 3100 via the natural language understanding module 3220 and may transmit the determined user intent and parameter to the user terminal 3100. The user terminal 3100 may select one path rule (e.g., A-B1-C3-D-F) from among multiple path rules (e.g., A-B1-C1, A-B1-C2, A-B1-C3-D-F, and A-B1-C3-D-E-F) on the basis of the transmitted intent or parameter.

Accordingly, the user terminal 3100 may complete the operation of the apps 3141 and 3143 by the selected one path rule.

According to an embodiment, when user input having insufficient information is received by the intelligent server 3200, the natural language understanding module 3220 may generate a path rule that partially corresponds to the received user input. For example, the natural language understanding module 3220 may transmit (①) the partially corresponding path rule to the intelligent agent 3151. The intelligent agent 3151 may transmit (②) the partially corresponding path rule to the execution manager module 3153, and the execution manager module 3153 may execute a first app 3141 according to the path rule. The execution manager module 3153 may transmit (③) information of an insufficient parameter to the intelligent agent 3151 while executing the first application 3141. The intelligent agent 3151 may request additional input from a user using information of the insufficient parameter. When additional input by the user is received (④), the intelligent agent 3151 may transmit and process the additional input to the intelligent server 3200. The natural language understanding module 3220 may generate an added path rule on the basis of parameter information and the intent of the additional user input and may transmit (⑤) the generated added path rule to the intelligent agent 3151. The intelligent agent 3151 may execute a second app 3143 by transmitting (⑥) the path rule to the execution manager module 3153.

According to an embodiment, the natural language understanding module 3220 may transmit a user information request to the personalization information server 3300 when user input with some information omitted is received by the intelligent server 3200. The personalization information server 3300 may transmit, to the natural language understanding module 3220, user information obtained by inputting the user input stored in the persona database. The natural language understanding module 3220 may use the user information to select a path rule corresponding to a user input with some operations omitted. Accordingly, even if the intelligent server 3200 receives the user input with some information omitted, the natural language understanding module 3220 may determine a path rule corresponding to the user input by requesting the omitted information in order to receive additional input or using user information.

Figure 22:
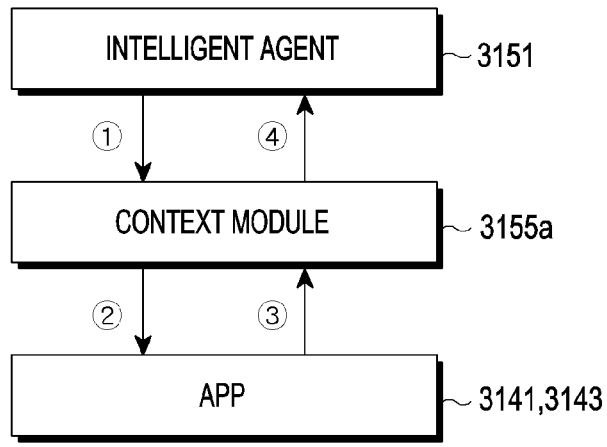
FIG. 22 is a diagram illustrating collecting of a current state by a context module of a processor according to an embodiment.

FIG. 22 is a diagram illustrating collecting of a current state by a context module of a processor according to an embodiment.

Referring to FIG. 22, when a context request is received (①) from the intelligent agent 3151, the context module 3155a may request (②), from apps 3141 and 3143, context information indicating the current states of the apps 3141 and 3143. According to an embodiment, the context module 3155a may receive (③) the context information from the apps 3141 and 3143 and may transmit (④) the received context information to the intelligent agent 3151.

According to an embodiment, the context module 3155a may receive multiple pieces of context information via the apps 3141 and 3143. For example, the context information may be information of the most recently executed apps 3141 and 3143. As another example, the context information may be information (e.g., when a picture is viewed in a gallery, information of the picture) of current states within the apps 3141 and 3143.

According to an embodiment, the context module 3155a may receive context information indicating the current state of the user terminal 3100 from a device platform as well as the apps 3141 and 3143. The context information may include general context information, user context information, or device context information.

The general context information may include general information of the user terminal 3100. The general context information may be determined via an internal algorithm by receiving data via a sensor hub, etc. of the device platform. For example, the general context information may include information of a current time/space. The information of the current time/space may include, for example, information of the current time or the current location of the user terminal 3100. The current time may be determined based on the time on the user terminal 3100, and the information on the current location may be determined using a global positioning system (GPS). For example, the general context information may include information on physical movement. The information on physical movement may include, for example, information on walking, running, driving, and the like. The information on physical movement may be determined using a motion sensor. For the information of driving, driving may be determined via the motion sensor, and boarding and parking may be determined through a Bluetooth connection with a vehicle. As another example, the general context information may include user activity information. The user activity information may include, for example, information of commuting, shopping, travelling, and the like. The user activity information may be determined using information of a place registered in a database by a user or an app.

The user context information may include information of a user. For example, the user context information may include information about the emotional state of the user. The information about the emotional state of the user may include, for example, information about a user's happiness, sadness, anger, and the like. As another example, the user context information may include information about the current state of the user. The information about the current state of the user may include, for example, information about interests, intent, and the like (e.g., shopping).

The general context information may include information on the state of the user terminal 3100. For example, the device context information may include information on a path rule executed by the execution manager module 3153. As another example, the device information may include battery information. The battery information may be determined, for example, via a charging or discharging state of a battery. As another example, the device information may include connected device information and network information. The connected device information may be determined, for example, via a communication interface connected to the device.

Figure 23:
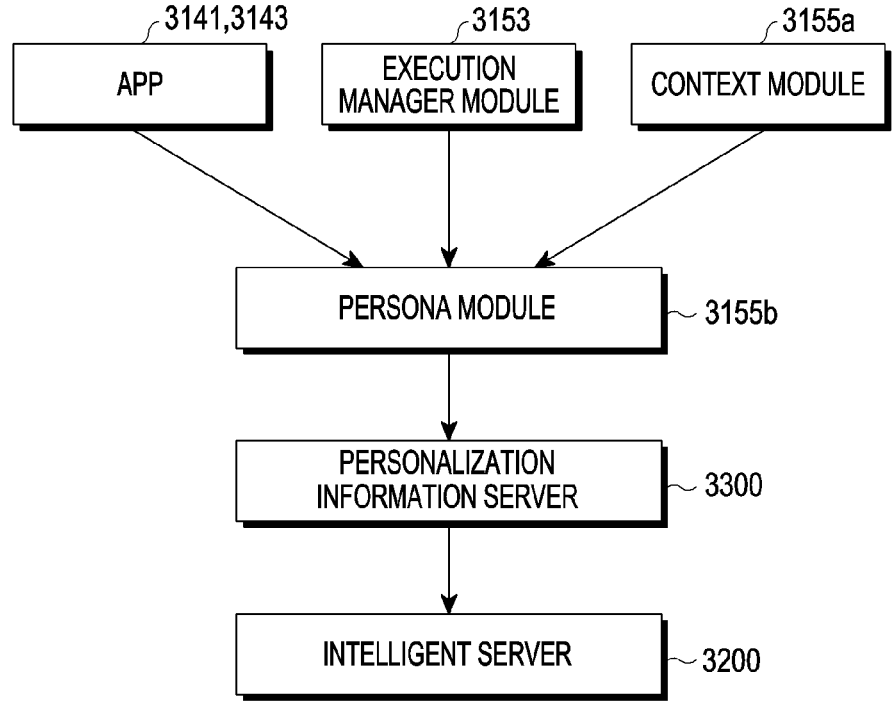
FIG. 23 is a diagram illustrating management of user information by a persona module according to an embodiment.

FIG. 23 is a diagram illustrating management of user information by a persona module according to an embodiment.

Referring to FIG. 23, the persona module 3155*b* may receive information on the user terminal 3100 from apps 3141 and 3143, the execution manager module 3153, or the context module 3155*a*. The apps 3141 and 3143 and the execution manager module 3153 may store, in an operation log database, result information obtained by executing operations 3141*b* and 3143*b* of the apps. The context module 3155*a* may store information on the current state of the user terminal 3100 in a context database. The persona module 3155*b* may receive the stored information from the operation log database or the context database. The data stored in the operation log database and the context database may be analyzed by, for example, an analysis engine and may be transmitted to the persona module 3155*b*.

According to an embodiment, the persona module 3155*b* may transmit, to the suggestion module 3155*c*, information received from the apps 3141 and 3143, the execution manager module 3153, or the context module 3155*a*. For example, the persona module 3155*b* may transmit data stored in the operation log database or the context database to the suggestion module 3155*c*.

According to an embodiment, the persona module 3155*b* may transmit, to the personalization information server 3300, information received from the apps 3141 and 3143, the execution manager module 3153, or the context module 3155*a*. For example, the persona module 3155*b* may periodically transmit, to the personalization information server 3300, data accumulated and stored in the operation log database or the context database.

According to an embodiment, the persona module 3155*b* may transmit data stored in the operation log database or the context database to the suggestion module 3155*c*. User information generated by the persona module 3155*b* may be stored in the persona database. The persona module 3155*b* may periodically transmit the user information stored in the persona database to the personalization information server 3300. According to an embodiment, information transmitted by the persona module 3155*b* to the personalization information server 3300 may be stored in the persona database. The personalization information server 3300 may infer user information necessary for generation of a path rule of the intelligent server 3200 using information stored in the persona database.

According to an embodiment, the user information inferred using information transmitted by the persona module 3155*b* may include profile information or preference information. The profile information or the preference information may be inferred from a user's account and accumulated information.

The profile information may include personal information of the user. For example, the profile information may include demographic information of the user. The demographic information may include, for example, the gender, age, etc. of the user. As another example, the profile information may include life event information. The life event information may be, for example, inferred by comparing log information with a life event model and may be reinforced by analyzing a behavior pattern. As another example, the profile information may include interest information. The interest information may include, for example, a shopping item of interest, a field of interest (e.g., sports, politics, etc.), and the like. As another example, the profile information may include activity area information. The activity area information may include, for example, information about a home, a workplace, and the like. The activity area information may include not only information on a location of a place but also information on a region for which priority is recorded based on a cumulative stay time and number of visits. As another example, the profile information may include activity time information. The activity time information may include, for example, information of wake-up time, commuting time, sleep time, and the like. The information of commuting time may be inferred using the activity area information (e.g., information of home and a workplace). The information of sleeping time may be inferred based on the time during which the user terminal 3100 is not used.

The preference information may include user preference information. For example, the profile information may include information on an app preference. The app preference may be inferred from, for example, a use history of the app (e.g., time-specific and place-specific use records). The app preference may be used to determine an app to be executed according to the current state (e.g., time and place) of the user. As another example, the preference information may include contact preference information. A contact preference may be inferred by, for example, analyzing a contact frequency for contact information (e.g., a time-specific contact frequency and a place-specific contact frequency). The contact preference may be used to determine contact information for contact according to the current state of the user (e.g., contact for duplicate names). As another example, the preference information may include setting information. The setting information may be inferred by, for example, analyzing configuration frequency information (e.g., a frequency of performing configuration to a setting value specific to a time and a place) of a specific setting value. The setting information may be used to configure a specific setting value according to the current state (e.g., time, place, or situation) of a user. As another example, the preference information may include a place preference. The place preference may be inferred from, for example, a visit record (e.g., a visit record specific to time) of a specific place. The place preference may be used to determine a place to be visited according to the current state (e.g., time) of the user. As another example, the preference information may include a command preference. The command preference may be inferred from, for example, a command use frequency (e.g., a use frequency specific to a time and place). The command preference may be used to determine an instruction pattern to be used according to the current state (e.g., time and place) of the user. Particularly, the command preference may include information of a menu most frequently selected by the user in the current state of the app that is being executed, the information being obtained by analyzing the log information.

Figure 24:
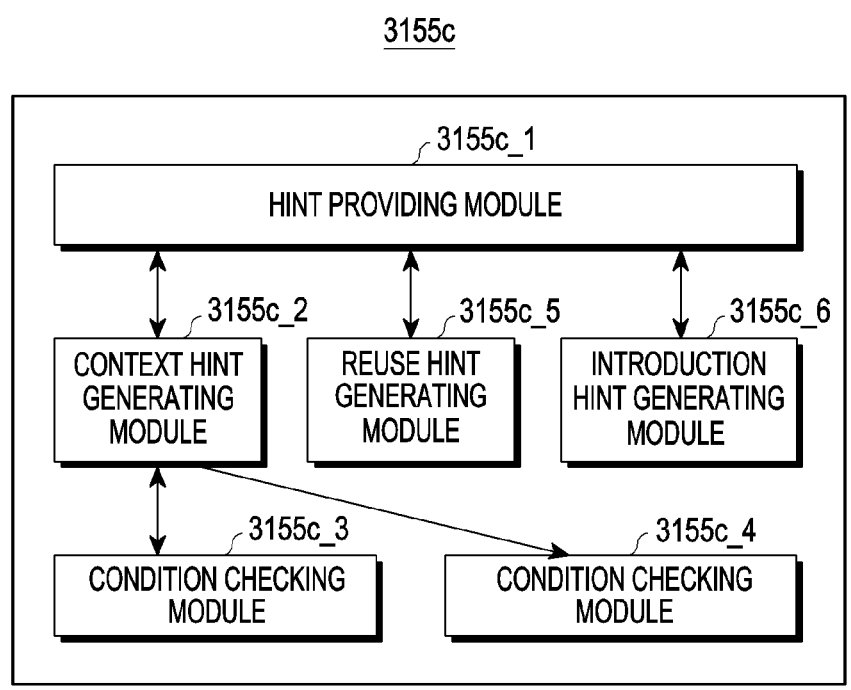
FIG. 24 is a block diagram illustrating a suggestion module according to an embodiment.

FIG. 24 is a block diagram illustrating a suggestion module according to an embodiment of the disclosure.

Referring to FIG. 24, the suggestion module 3155*c* may include a hint providing module 3155*c*_1, a context hint generating module 3155*c*_2, a condition checking module 3155*c*_3, a condition model module 3155*c*_4, a reuse hint generating module 3155*c*_5, or an introduction hint generating module 3155*c*_6.

According to an embodiment, the hint providing module 3155*c*_1 may provide a hint to a user. For example, the hint providing module 3155*c*_1 may receive a hint generated from the context hint generating module 3155c_2, the reuse hint generating module 3155c_5, or the introduction hint generating module 3155c_6 so as to provide the generated hint to the user.

According to an embodiment, the context hint generating module 3155c_2 may generate a hint that may be recommended according to the current state via the condition checking module 3155c_3 or the condition model module 3155c_4. The condition checking module 3155c_3 may receive information corresponding to the current state via the intelligent service module 3155, and the condition model module 3155c_4 may configure a condition model using the received information. For example, the condition model module 3155c_4 may identify a time, a location, a situation, and an app in use at the time of providing a hint to the user, and may provide the user with a hint that is likely to be used under the corresponding conditions in descending order of priority.

According to an embodiment, the reuse hint generation module 3155c_5 may generate a hint that may be recommended in consideration of a frequency of use according to the current state. For example, the reuse hint generation module 3155c_5 may generate a hint in consideration of a use pattern of the user.

According to an embodiment, the introduction hint generation module 3155c_6 may generate a hint that introduces, to the user, a new feature or a feature frequently used by another user. For example, a hint to introduce the new function may include an introduction (e.g., an operation method) to the intelligent agent 3151.

According to another embodiment, the context hint generating module 3155c_2, the condition checking module 3155c_3, the condition model module 3155c_4, the reuse hint generation module 3155c_5, or the introduction hint generation module 3155c_6 of the suggestion module 3155c may be included in the personalization information server 3300. For example, the hint providing module 3155c_1 of the suggestion module 3155c may receive a hint from the context hint generating module 3155c_2, the reuse hint generating module 3155c_5, or the introduction hint generating module 3155c_6 of the user personalization information server 3300 so as to provide the received hint to the user.

According to an embodiment, the user terminal 3100 may provide the hint in accordance with the following sequence of processes. For example, when the hint providing module 3155c_1 receives (①) a hint providing request from the intelligent agent 3151, the hint providing module 3155c_1 may transmit (②) the hint generating request to the context hint generating module 3155c_2. Upon receiving the hint generation request, the context hint generating module 3155c2 may receive (④) information corresponding to the current state from the context module 3155a and the personas module 3155b by using (③) the condition checking module 3155c_3. The condition checking module 3155c_3 may transmit (⑤) the received information to the condition model module 3155c_4, and the condition model module 3155c4 may assign, using the information, a priority to a hint in a descending order of availability for the condition among hints provided to the user. The context hint generating module 3155c_2 may confirm (⑥) the condition and may generate a hint corresponding to the current state. The context hint generating module 3155c_2 may transmit (⑦) the generated hint to the hint providing module 3155c_1. The hint providing module 3155c_1 may arrange the hints according to a specified rule and may transmit (⑧) the hints to the intelligent agent 3151.

According to an embodiment, the hint providing module 3155c_1 may generate multiple context hints and may assign priorities to the multiple context hints according to the specified rule. According to an embodiment, the hint providing module 3155c_1 may first provide the user with a hint having a higher priority among the multiple context hints.

According to an embodiment, the user terminal 3100 may suggest a hint in accordance with a use frequency. For example, when the hint providing module 3155c_1 receives (①) a hint providing request from the intelligent agent 3151, the hint providing module 3155c_1 may transmit (②) the hint generating request to the reuse hint generating module 3155c_5. Upon receiving the hint generation request, the reuse hint generation module 3155c_5 may receive (③) user information from the persona module 3155b. For example, the reuse hint generation module 3155c_5 may receive a path rule included in the user's preference information of the persona module 3155b, a parameter included in the path rule, a frequency of execution of the app, and space-time information used by the app. The reuse hint generation module 3155c_5 may generate a hint corresponding to the received user information. The reuse text hint generation module 3155c_5 may transmit (④) the generated hint to the hint providing module 3155c_1. The hint providing module 3155c_1 may arrange the hint and may transmit (⑤) the hint to the intelligent agent 3151.

According to an embodiment, the user terminal 3100 may propose a hint for a new function. For example, when the hint providing module 3155c_1 receives (①) a hint providing request from the intelligent agent 3151, the hint providing module 3155c_1 may transmit (②) the hint generating request to the introduction hint generating module 3155c_6. The introduction hint generation module 3155c_6 may transmit (③) an introduction hint providing request from the suggestion server 3400 so as to receive (④) information on a function to be introduced from the suggestion server 3400. For example, the suggestion server 3400 may store information of the function to be introduced, and a hint list for the function to be introduced may be updated by a service operator. The introduction hint generation module 3155c_6 may transmit (⑤) the generated hint to the hint providing module 3155c_1. The hint providing module 3155c_1 may arrange the hint and may transmit (⑥) the hint to the intelligent agent 3151.

Accordingly, the suggestion module 3155c may provide the user with the hint generated by the context hint generating module 3155c_2, the reuse hint generation module 3155c_5, or the introduction hint generation module 3155c_6. For example, the suggestion module 3155c may display the generated hint on an app that operates the intelligent agent 3151 and may receive input to select the hint from the user via the app.

An operation method of an electronic device according to various embodiments may include: receiving a first user input including a request to perform a task using the electronic device; transmitting data associated with the first user input to an external server; receiving, from the external server, a response including information of multiple states of the electronic device, which have a sequence and are configured to perform the task; after receiving the response, performing the task by configuring to have the multiple states having the sequence; receiving a second user input including a request to cancel at least some of the performed task; and at least on the basis of the second user input, returning to one state among the multiple states having the sequence.

The operation method of the electronic device according to various embodiments may further include: transmitting data for the second user input; and receiving another response from the external server. The another response may allow the electronic device to return to the one state among the multiple states having the sequence.

Performing of the task by configuring to have the multiple states having the sequence according to various embodiments may include displaying at least one of an image or a screen associated with the multiple states having the sequence.

The operation method of the electronic device according to various embodiments may further include, when the second user input includes a request to cancel all of the performed tasks, returning to the state before the electronic device had the states having the sequence on the basis of the second user input.

An operation method of an electronic device according to various embodiments may include: receiving a first user input including a request to perform a first task; transmitting first data associated with the first user input to an external server; receiving, from the external server, a first response including first information of first multiple states of the electronic device, which have a sequence and are configured to perform the task; after receiving the first response, performing the first task by configuring to have the first multiple states having the sequence; receiving a second user input including a second request to perform a second task; and transmitting, to the external server, at least a part of the first information and second data associated with the second user input.

The second user input according to various embodiments may include a request to cancel at least a part of the performed first task.

The operation method of the electronic device according to various embodiments may further include returning to one state among the first multiple states on the basis of at least a part of the second user input.

An operation method of an electronic device according to various embodiments may include: displaying a first screen; acquiring a first user utterance while the first screen is being displayed; displaying, instead of the first screen, a second screen associated with a first task among multiple tasks corresponding to the first user utterance; displaying, instead of the second screen, a third screen associated with a second task among the multiple tasks corresponding to the first user utterance; while the third screen is being displayed, acquiring a cancellation command for at least some of the multiple tasks; and selecting one of the first screen or the second screen using an analysis result of the cancellation command, and displaying the selected screen.

The cancellation command according to various embodiments may include a cancellation request for all of the multiple tasks. Selection of one of the first screen or the second screen by using the analysis result of the cancellation command and displaying of the selected screen according to various embodiments may include: cancelling all of the multiple tasks; and displaying the first screen.

The cancellation command according to various embodiments may further include a request to perform at least one other task that is at least partially different from the multiple tasks. Selection of one of the first screen or the second screen by using the analysis result of the cancellation command and displaying of the selected screen according to various embodiments may include: cancelling all of the multiple tasks; and after displaying the first screen, displaying a fourth screen associated with the at least one other task, instead of the first screen.

The cancellation command according to various embodiments may include a cancellation request for some of the multiple tasks. Selection of one of the first screen or the second screen by using the analysis result of the cancellation command and displaying of the selected screen according to various embodiments may include: cancelling the some of the multiple tasks; and displaying the second screen.

The cancellation command according to various embodiments may further include a request to perform at least one still other task that is at least partially different from the multiple tasks. Selection of one of the first screen or the second screen by using the analysis result of the cancellation command and displaying of the selected screen according to various embodiments may include: cancelling the some of the multiple tasks; and after displaying the second screen, displaying a fifth screen associated with the at least one still other task, instead of the second screen.

The cancellation command according to various embodiments may further include a request to perform at least one still other task that is at least partially different from the multiple tasks. Selection of one of the first screen or the second screen by using the analysis result of the cancellation command and displaying of the selected screen according to various embodiments may include: cancelling the some of the multiple tasks; and while cancelling some tasks, displaying a sixth screen configured to perform another task, instead of the second screen.

The second screen according to various embodiments may be one among a screen displayed immediately before the third screen is displayed, a screen corresponding to a state requiring additional user input in order to perform still another task, and a screen immediately after an application in use is changed.

The operation method of the electronic device according to various embodiments may further include: transmitting data on the first user utterance to the external server; receiving the multiple tasks corresponding to the first user utterance; transmitting data on the cancellation command to the external server; and receiving the analysis result of the cancellation command.

The operation method of the electronic device according to various embodiments may include: acquiring first text by performing Automatic Speech Recognition (ARS) processing of data on the first user utterance; and acquiring the multiple tasks by performing Natural Language Understanding (NLU) processing of the first text.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a microphone;
   a speaker;
   a touchscreen display;
   a communication circuit;
   at least one processor operatively connected to the microphone, the speaker, the touchscreen display, and the communication circuit; and
   a memory operatively connected to the processor and storing instructions that, when executed by the at least one processor, cause the at least one processor to:
   receive a first user input through the touchscreen display or the microphone;
   identify a service provider and a detailed service based on at least a part of the first user input;
   select a first menu corresponding to the detailed service from menu information comprising one or more detailed services provided by the service provider;
   attempt to connect a call to the service provider using the communication circuit;
   based on the call to the service provider being connected, control the communication circuit to transmit one or more responses until reaching a step corresponding to the first menu in response to one or more voice prompts provided by the service provider;
   in response to reaching the first menu, determine whether an attendant is connected based on at least one voice transmitted by the service provider;
   in response to completion of connection to the attendant, output a notification indicating that the connection to the attendant has been completed, using the speaker or the touchscreen display; and
   in response to reception of a second user input for the output notification, display a screen for a call with the service provider.

2. The electronic device of claim 1, wherein, to cause the at least one processor to select the first menu corresponding to the detailed service from the menu information comprising one or more detailed services provided by the service provider, the memory stores instructions that, when executed by the at least one processor, cause the at least one processor to:
   request the menu information to an external server using the communication circuit; and
   receive the menu information from the external server using the communication circuit.

3. The electronic device of claim 2, wherein:
   the menu information comprises information of one or more services provided by the service provider in a tree structure, and the memory stores instructions that, when executed by the at least one processor, cause the at least one processor to select, as the first menu, one of one or more services located in a leaf node in the tree structure in response to the detailed service.

4. The electronic device of claim 3, wherein the memory stores instructions that, when executed by the at least one processor, cause the at least one processor to:
in response to the detailed service being matched to a second menu located in an intermediate node in the tree structure, display, via the touchscreen display, information of a parent node or a child node of the second menu; and
based on a third user input received in response to the displayed information, select the first menu located in the leaf node in the tree structure in response to the detailed service.

5. The electronic device of claim 1, wherein, to cause the at least one processor to determine whether the attendant is connected based on the at least one voice transmitted by the service provider, the memory stores instructions that, when executed by the at least one processor, cause the at least one processor to:
by using a determination model obtained by learning an attendant voice and a first voice among the at least one voice, perform comparison to determine whether the first voice is similar to the determination model by a threshold value or greater.

6. The electronic device of claim 1, wherein, to cause the at least one processor to determine whether the attendant is connected based on the at least one voice transmitted by the service provider, the memory stores instructions that, when executed by the at least one processor, cause the at least one processor to:
extract at least one audio characteristic from a first voice, and
perform comparison to determine, using a determination model obtained by learning the at least one audio characteristic extracted from voice of the attendant, whether the first voice is similar to the determination model by a threshold value or greater.

7. The electronic device of claim 1, wherein, to cause the at least one processor to determine whether the attendant is connected based on the at least one voice transmitted by the service provider, the memory stores instructions that, when executed by the at least one processor, cause the at least one processor to:
convert a first voice of the at least one voice into text;
determine a correlation between the converted text and a determination model obtained by learning corpus for designated greetings; and
based on the correlation including a value equal to or greater than a threshold value, determine that the first voice corresponds to voice of the attendant.

8. The electronic device of claim 1, wherein, as to cause the at least one processor to control the communication circuit to transmit one or more responses until reaching a step corresponding to the first menu in response to one or more voice prompts provided by the service provider, the memory stores instructions that, when executed by the at least one processor, cause the at least one processor to:
control the communication circuit to receive, from the service provider, a voice prompt requesting user information of the electronic device; and
control the communication circuit to transmit, to the service provider, a response generated based on the user information of the electronic device.

9. The electronic device of claim 8, wherein the memory stores instructions that, when executed by the at least one processor, cause the at least one processor to:
in response to selection of the first menu, check whether the service provider requests the user information of the electronic device in order to provide the first menu; and
in response to requesting of the user information of the electronic device, acquire the user information before attempting call connection to the service provider.

10. The electronic device of claim 1, wherein the memory stores instructions that, when executed by the at least one processor, cause the at least one processor to execute the call connection in a background until the second user input is received.

11. The electronic device of claim 1, wherein the memory stores instructions that, when executed by the at least one processor, cause the at least one processor to:
extract at least one keyword related to a service provider and a detailed service from the first user input;
select a service provider corresponding to the at least one keyword from among multiple service providers, wherein each of the multiple service providers provides one or more services via call connection; and
acquire an identification number for call connection to the service provider.

12. The electronic device of claim 1, wherein the memory stores instructions that, when executed by the at least one processor, cause the at least one processor to, after outputting a notification indicating that the connection to the attendant has been completed, before receiving the second user input for the output notification, transmit, to the service provider, a message requesting maintenance of connection to the attendant of the service provider.

13. The electronic device of claim 1, wherein the memory stores instructions that, when executed by the at least one processor, cause the at least one processor to:
estimate a time required for connection to the attendant of the service provider; and
provide information of the estimated time by using the touchscreen display.

14. An electronic device comprising:
a speaker;
a touchscreen display;
a communication circuit;
at least one processor operatively connected to the speaker, the display, and the communication circuit; and
a memory operatively connected to the at least one processor and storing instructions that, when executed by the at least one processor, cause the processor to:
execute a calling application;
attempt to connect a call to a service provider using the communication circuit;
during call connection to the service provider, receive a first user input requesting a standby mode for connection to an attendant of the service provider, wherein the calling application is executed in a background in the standby mode;
in response to the first user input, execute the calling application in the standby mode;
while the calling application is being executed in the standby mode, determine whether the attendant is connected based on a voice transmitted by the service provider;
in response to completion of connection to the attendant, output a notification indicating that the connection to the attendant has been completed using the speaker or the touchscreen display; and in response to reception of a second user input for the output notification, terminate the standby mode.

15. The electronic device of claim 14, wherein the memory stores instructions that, when executed by the at least one processor, cause the at least one processor to:

display an icon indicating a function to provide the standby mode via the touchscreen display; and in response to an input of selecting the icon, switch a mode of the calling application to the standby mode.

16. The electronic device of claim 14, wherein, to cause the at least one processor to determine whether the attendant is connected based on at least one voice transmitted by the service provider, the memory stores instructions that, when executed by the at least one processor, cause the at least one processor to:

by using a determination model obtained by learning an attendant voice and a first voice from among the at least one voice, perform comparison to determine whether the first voice is similar to the determination model by a threshold value or greater.

17. The electronic device of claim 14, wherein, to cause the at least one processor to determine whether the attendant is connected based on at least one voice transmitted by the service provider, the memory stores instructions that, when executed by the at least one processor, cause the at least one processor to:

extract at least one audio characteristic from a first voice, and perform comparison to determine, using a determination model obtained by learning the at least one audio characteristic extracted from voice of the attendant, whether the first voice is similar to the determination model by a threshold value or greater.

18. The electronic device of claim 14, wherein, to cause the at least one processor to determine whether the attendant is connected based on at least one voice signal transmitted by the service provider, the memory stores instructions that, when executed by the at least one processor, cause the at least one processor to:

convert a first voice of the at least one voice into text;

determine a correlation between the converted text and a determination model obtained by learning corpus for designated greetings; and based on the correlation including a value equal to or greater than a threshold value, determine that the first voice corresponds to voice of the attendant.

19. The electronic device of claim 14, wherein the memory stores instructions that, when executed by the at least one processor, cause the at least one processor to, while the calling application is being executed in a standby mode:

refrain from displaying an execution screen of the calling application on the touchscreen display, and restrict a function of the speaker or microphone.

20. An electronic device comprising:

a communication circuit;

at least one processor operatively connected to the communication circuit; and a memory operatively connected to the at least one processor and storing instructions that, when executed by the at least one processor, cause the processor to:

control the communication circuit to receive a request for a call connection to a service provider from an external electronic device, wherein the request comprises user information of the external electronic device and at least one piece of keyword information related to a detailed service and the service provider;

in response to receiving the request, acquire an identification number for the call connection to the service provider;

select a first menu corresponding to the detailed service included in the request from menu information comprising one or more detailed services provided by the service provider;

control the communication circuit to attempt to connect a call between the service provider and the external electronic device;

based on the call to the service provider being connected, control the communication circuit to transmit one or more responses until reaching a step corresponding to the first menu in response to one or more voice prompts provided by the service provider;

in response to reaching the first menu, determine whether an attendant is connected based on at least one voice transmitted by the service provider;

in response to completion of connection to the attendant, provide the external electronic device with information indicating that the connection to the attendant of the service provider has been completed using the communication circuit; and in response to reception of a message indicating that the call between the external electronic device and the service provider has been connected, terminate the call connection to the service provider.

* * * * *